United States Patent
Kim et al.

(10) Patent No.: US 7,957,349 B2
(45) Date of Patent: Jun. 7, 2011

(54) HANDOVER METHOD AND APPARATUS IN A MOBILE COMMUNICATION SYSTEM

(75) Inventors: Seong-Hun Kim, Suwon-si (KR);
Kyeong-In Jeong, Hwaseong-si (KR);
Gert Jan Van Lieshout, Staines (GB);
Himke Van Der Velde, Staines (GB)

(73) Assignee: Samsung Electronics Co., Ltd (KR)

( * ) Notice: Subject to any disclaimer, the term of this patent is extended or adjusted under 35 U.S.C. 154(b) by 833 days.

(21) Appl. No.: 11/903,080

(22) Filed: Sep. 20, 2007

(65) Prior Publication Data
US 2008/0069053 A1    Mar. 20, 2008

(30) Foreign Application Priority Data

Sep. 20, 2006  (KR) .................. 10-2006-0091478
May 29, 2007   (KR) .................. 10-2007-0052262

(51) Int. Cl.
*H04Q 7/00*   (2006.01)

(52) U.S. Cl. ....................................... 370/331

(58) Field of Classification Search ............... None
See application file for complete search history.

(56) References Cited

U.S. PATENT DOCUMENTS

2003/0189909 A1   10/2003   Chao et al.

FOREIGN PATENT DOCUMENTS

| WO | WO 98/09458   | 3/1998 |
| WO | WO 99/22530   | 5/1999 |
| WO | WO 2005/055636 | 6/2005 |
| WO | WO 2006/052086 | 5/2006 |

*Primary Examiner* — Ayaz R Sheikh
*Assistant Examiner* — Blanche Wong
(74) *Attorney, Agent, or Firm* — The Farrell Law Firm, P.C.

(57) ABSTRACT

A method and apparatus for minimizing data forwarding between Evolved Node Bs (ENBs) during a handover. A User Equipment (UE) sends a status report to an ENB of a source cell immediately before the handover occurs. In this manner, a target cell avoids retransmission of the RLC PDUs, which were successfully transmitted but have not yet been ACKnowledged (ACKed) by the UE, thereby minimizing the amount of data being forwarded from the ENB of the source cell to an ENB of the target cell.

11 Claims, 18 Drawing Sheets

HANDOVER METHOD AND APPARATUS IN A MOBILE COMMUNICATION SYSTEM

PRIORITY

This application claims priority under 35 U.S.C. §119(a) to a Korean Patent Application filed in the Korean Intellectual Property Office on Sep. 20, 2006 and assigned Serial No. 2006-91478, and a Korean Patent Application filed in the Korean Intellectual Property Office on May 29, 2007 and assigned Serial No. 2007-52262, the disclosures of both of which are incorporated herein by reference.

BACKGROUND OF THE INVENTION

1. Field of the Invention

The present invention relates generally to a mobile communication system, and in particular, to a method and apparatus for, upon occurrence of a handover, minimizing data forwarding between Node Bs.

2. Description of the Related Art

The Universal Mobile Telecommunication Service (UMTS) system is a $3^{rd}$ generation asynchronous mobile communication system that uses Wideband Code Division Multiple Access (W-CDMA) and is based on Global System for Mobile Communications (GSM) and General Packet Radio Services (GPRS), both of which are European mobile communication systems.

In the $3^{rd}$ Generation Partnership Project (3GPP) in charge of the UMTS standardization, Long Term Evolution (LTE) is now under discussion as the next generation mobile communication system of the UMTS system. Service providers utilizing LTE, a technology for realizing high-speed packet-based communication having a data rate of a maximum of about 100 Mbps, aim at deployment of LTE approximately by year 2010. To this end, several schemes are under discussion, which include, for example, one scheme of reducing the number of nodes located in a communication path by simplifying configurations of the networks, and another scheme of maximally approximating wireless protocols to wireless channels.

FIG. 1 illustrates an exemplary configuration of the next generation mobile communication system. The system configuration shown herein is a configuration of the UMTS-based system.

Referring to FIG. 1, as illustrated, Evolved Radio Access Networks (E-RANs) 110 and 112 are simplified into a 2-node configuration of (Evolved Node Bs (or ENBs) 120, 122, 124, 126 and 128, and anchor nodes 130 and 132. A User Equipment (UE) 101 accesses the Internet Protocol (IP) network by means of the E-RANs 110 and 112.

The ENBs 120 to 128 each correspond to the existing Node B of the UMTS system, and are connected to the UE 101 by wireless channels. Unlike the existing Node B, the ENBs 120 to 128 perform complex functions. In LTE, because all user traffics including the real-time service such as Voice over IP (VoIP) are serviced over a shared channel, there is a need for an apparatus for collecting status information of UEs and performing scheduling depending on the collected information, and this operation is managed by the ENBs 120 to 128. One ENB generally controls a plurality of cells.

To realize a maximum data rate of about 100 Mbps, LTE is expected to use Orthogonal Frequency Division Multiplexing (OFDM) as a wireless access technology in a 20-MHz bandwidth. In addition, LTE will employ Adaptive Modulation & Coding (AMC) that adaptively determines a modulation scheme and a channel coding rate according to channel conditions of the UEs.

Many next generation mobile communication systems including LTE use Hybrid Automatic Retransmission reQuest (HARQ) as an error correction technique. HARQ is a technique of soft-combining previously received data with retransmitted data without discarding the previously received data, thereby increasing a reception success rate. More specifically, a receiving HARQ entity determines presence/absence of error in a received packet, and then sends an HARQ positive ACKnowledgement (HARQ ACK) signal or an HARQ negative ACKnowledgement (HARQ NACK) signal to a transmitting HARQ entity. The transmitting HARQ entity performs retransmission of the HARQ packet or transmission of a new HARQ packet according to the HARQ ACK/NACK signal. The receiving HARQ entity soft-combines the retransmitted packet with the previously received packet, thereby reducing a probability of error occurrences.

FIG. 2 illustrates a protocol stack of the LTE system.

Referring to FIG. 2, Packet Data Convergence Protocols (PDCPs) 205 and 240 each take charge of an IP header compression/decompression operation, and Radio Link Control (RLC) layers and 210 and 235 each reconfigure a PDCP Packet Data Unit (PDU) (hereinafter, a packet output from a particular protocol entity will be referred to as a 'PDU of the protocol') in an appropriate size, and performs an Automatic Retransmission reQuest (ARQ) operation thereon. As shown in FIG. 2, the PDCPs 205 and 240 are located in a UE and an Anchor node, respectively, and the RLC layers and 210 and 235 are located in the UE and an ENB, respectively.

Medium Access Control (MAC) layers 215 and 230, connected to several RLC entities configured in one UE, each multiplex RLC PDUs to a MAC PDU, and demultiplex RLC PDUs from the MAC PDU.

PHYsical (PHY) layers 220 and 225 each channel-code and modulate upper layer data into an OFDM symbol and transmit the OFDM symbol over a wireless channel. Further, the PHY layers 220 and 225 each demodulate and channel-decode an OFDM symbol received over a wireless channel, and forward the decoded data to the upper layer. Most HARQ operation of channel-decoding a received packet, soft-combining the channel-decoded packet with the previously received packet, and performing a Cyclic Redundancy Check (CRC) operation thereon is achieved in the physical layers, and the MAC layers control this operation.

FIG. 3 illustrates an example of an RLC operation.

As described above, the RLC layers and 210 and 235 guarantee reliable data transmission/reception through the ARQ process. With reference to FIG. 3, the ARQ process will be described in more detail. A transmission buffer 305 of a transmitting RLC layer (or an RLC layer in a transmitting entity) stores PDCP PDUs 310 until the transmission buffer 305 transmits the PDCP PDUs 310 to a receiving RLC layer (or an RLC layer in a receiving entity). The PDCP PDUs 310 are transmitted to the receiving RLC layer after they are reconfigured in an appropriate size in a framing block 315 and then a sequence number, increasing by increments of one, is added to each PDCP PDU 305, and the resulting RLC PDUs are buffered in a retransmission buffer 320 until an ACK signal is received from the receiving RLC layer.

The receiving RLC layer stores the received RLC PDUs in a reception buffer 330, recognizes a sequence number of a missing RLC PDU by checking the sequence numbers, and sends a request for retransmission of the missing RLC PDU to the transmitting RLC layer.

In the example of FIG. 3, RLC PDU[7]~RLC PDU[10] are transmitted at a time, and among them, only the RLC PDU[7] and the RLC PDU[9] are received and stored in the reception buffer 330. The receiving RLC layer sends a status report 340, containing information indicating that it has normally received the RLC PDU[7] and the RLC PDU[9] and has failed to receive the RLC PDU[8] at an arbitrary time, to the transmitting RLC layer. Then, the transmitting RLC layer retransmits the retransmission-requested RLC PDU[8] stored in the retransmission buffer 320, and discards the normally transmitted RLC PDU[7] and RLC PDU[9].

FIG. 4 illustrates a data forwarding process during a handover.

When a UE makes a handover from a source cell of an ENB where it is currently located to a target cell of another ENB (hereinafter, an 'inter-ENB handover'), the RLC entities are reconfigured in the target cell, so the source cell forwards the packets, whose transmission is not yet completed, to the target cell. The data 430 being forwarded from the RLC entity of the source ENB 420 to the RLC entity of the target ENB 425 during inter-ENB handover may include a non-transmitted PDCP PDU(s), a transmitted PDCP PDU(s), and an ACK signal which has not been received yet.

When an arbitrary PDCP PDU is transmitted in n RLC PDUs in a distributed manner, the PDCP PDU is not regarded as positively acknowledged, until ACK signals are received for all of the n RLC PDUs.

The RLC entity of the target ENB 425 transmits the non-transmitted PDCP PDUs and the un-ACKed transmitted PDCP PDUs to the UE, thereby preventing the packet loss that may occur during inter-ENB handover. However, because the transmission line used for inter-ENB data transmission is generally low in the data rate, it is preferable to minimize the inter-ENB data forwarding.

SUMMARY OF THE INVENTION

An aspect of the present invention is to address at least the problems and/or disadvantages and to provide at least the advantages described below. Accordingly, an aspect of the present invention is to provide a method and apparatus for minimizing data forwarding from a source ENB to a target ENB when a UE makes a handover to a cell belonging to another ENB.

According to one aspect of the present invention, there is provided a method for performing a handover from a source cell to a target cell by a User Equipment (UE) in a mobile communication system. The handover method includes sending a measurement report on received signal strengths of adjacent cells, to an Evolved Node B (ENB) of the source cell; sending, to the ENB of the source cell, a status report including a sequence number of successfully received packet data and a sequence number of missing packet data; and upon a receipt of a handover command from the ENB of the source cell, performing a handover.

According to another aspect of the present invention, there is provided a User Equipment (UE) apparatus for performing a handover from a source cell to a target cell in a mobile communication system. The UE apparatus includes a measurement controller for measuring received signal strengths of adjacent cells; a radio resource controller for generating a message using the measurement result received from the measurement controller, and sending the generated message to an Evolved Node B (ENB) of the source cell; and a radio link controller for, upon a receipt of a status report command from the radio resource controller, generating a status report message before performing a handover to the target cell, and sending the generated status report message to the ENB of the source cell.

According to further another aspect of the present invention, there is provided a method for sending a buffer status report by a User Equipment (UE) in a mobile communication system. The method includes, if a measurement report of a first type having a high handover-causing possibility occurs, sending a request for resource allocation for a buffer status report to an Evolved Node B (ENB); sending a buffer status report including information on retransmission-required packet data over resources allocated by the request; and sending a measurement report and a downlink status report and retransmitting the retransmission-required packet data over resources allocated according to the buffer status report.

According to yet another aspect of the present invention, there is provided a User Equipment (UE) apparatus for sending a buffer status report to an Evolved Node B (ENB) of a source cell in a mobile communication system. The UE apparatus includes a measurement controller for measuring received signal strengths of adjacent cells; a radio resource controller for generating a message using the measurement result received from the measurement controller, and sending the generated message to the ENB of the source cell; a radio link controller for, upon a receipt of a status report command from the radio resource controller, generating a status report message before performing a handover to a target cell, and sending the generated status report message to the ENB of the source cell; a buffer status report controller for, if a measurement report of a first type having a high handover-causing possibility occurs, starting a buffer status report procedure under control of the radio resource controller and configuring a buffer status report including information on retransmission-scheduled data; and a physical layer for sending the configured buffer status report to the ENB.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides a method and apparatus for minimizing data forwarding from an ENB (source ENB) of the cell where a UE is currently located to an ENB (target ENB) of a target cell to which the UE will make handover, when the UE makes a handover to a cell belonging to another ENB.

Although the present invention will be described herein with reference to the LTE system evolved from the UMTS system, by way of example, the present invention can be applied to all mobile communication systems employing ENB scheduling without separate modification.

As described above, during inter-ENB handover, a source ENB forwards the non-transmitted PDCP PDUs and the un-ACKnowledged (un-ACKed) transmitted PDCP PDUs to a target ENB. Although the forwarding of the non-transmitted PDCP PDUs is unavoidable, if ACK signals are received from the UE before the handover is performed, the forwarding of the un-ACKed transmitted PDCP PDUs is not needed.

Figure 1:
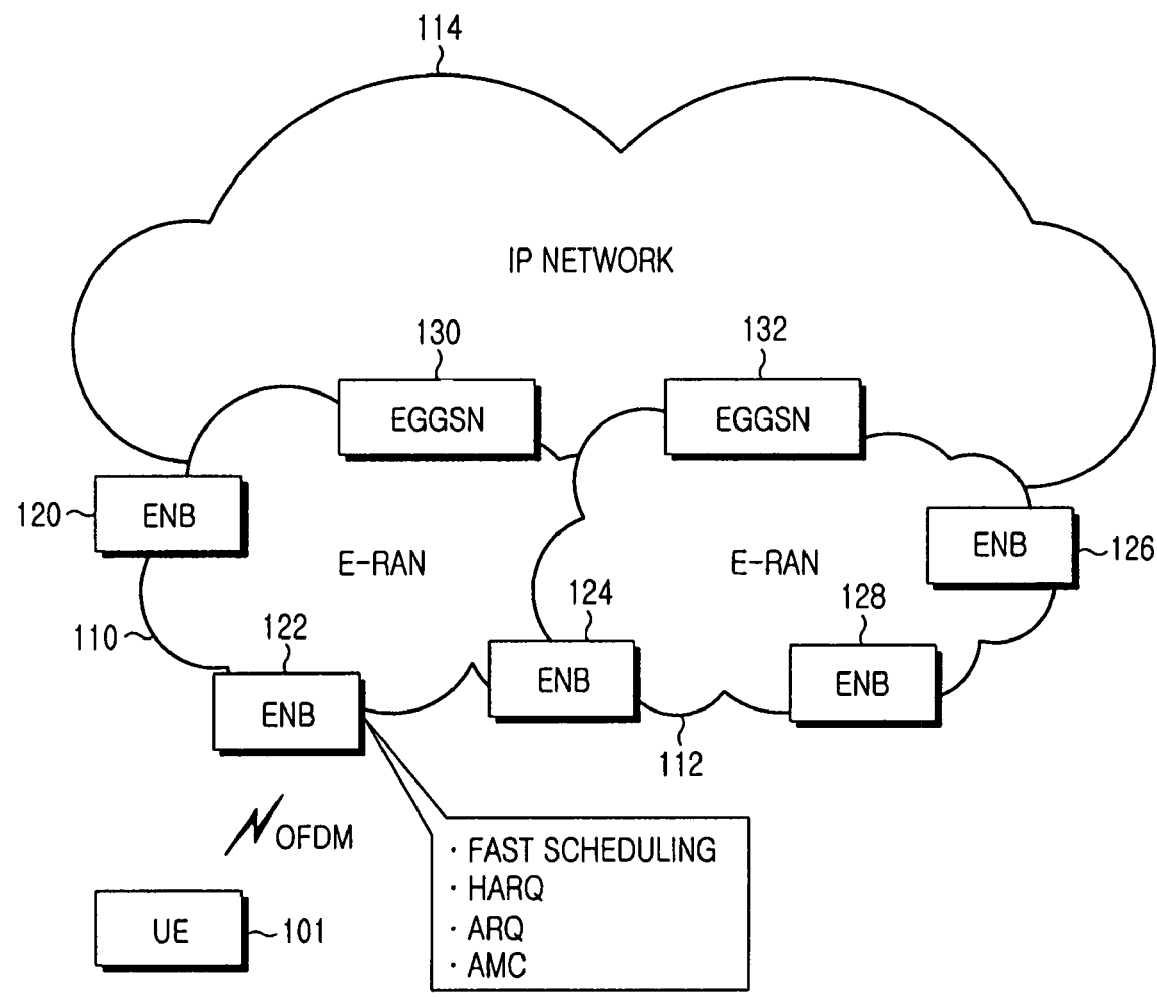
FIG. 1 illustrates an exemplary configuration of the next generation mobile communication system.
Figure 2:
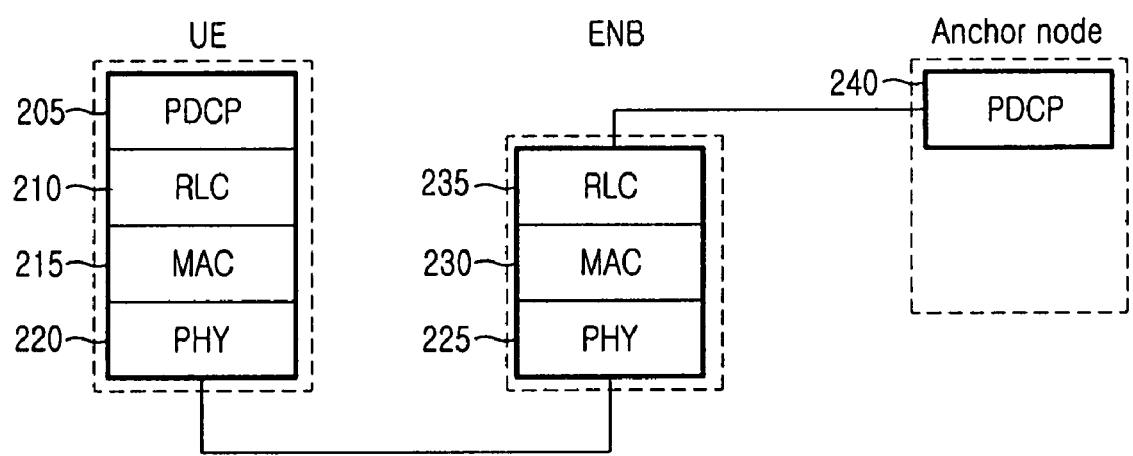
FIG. 2 illustrates a protocol stack of the LTE system.
Figure 3:
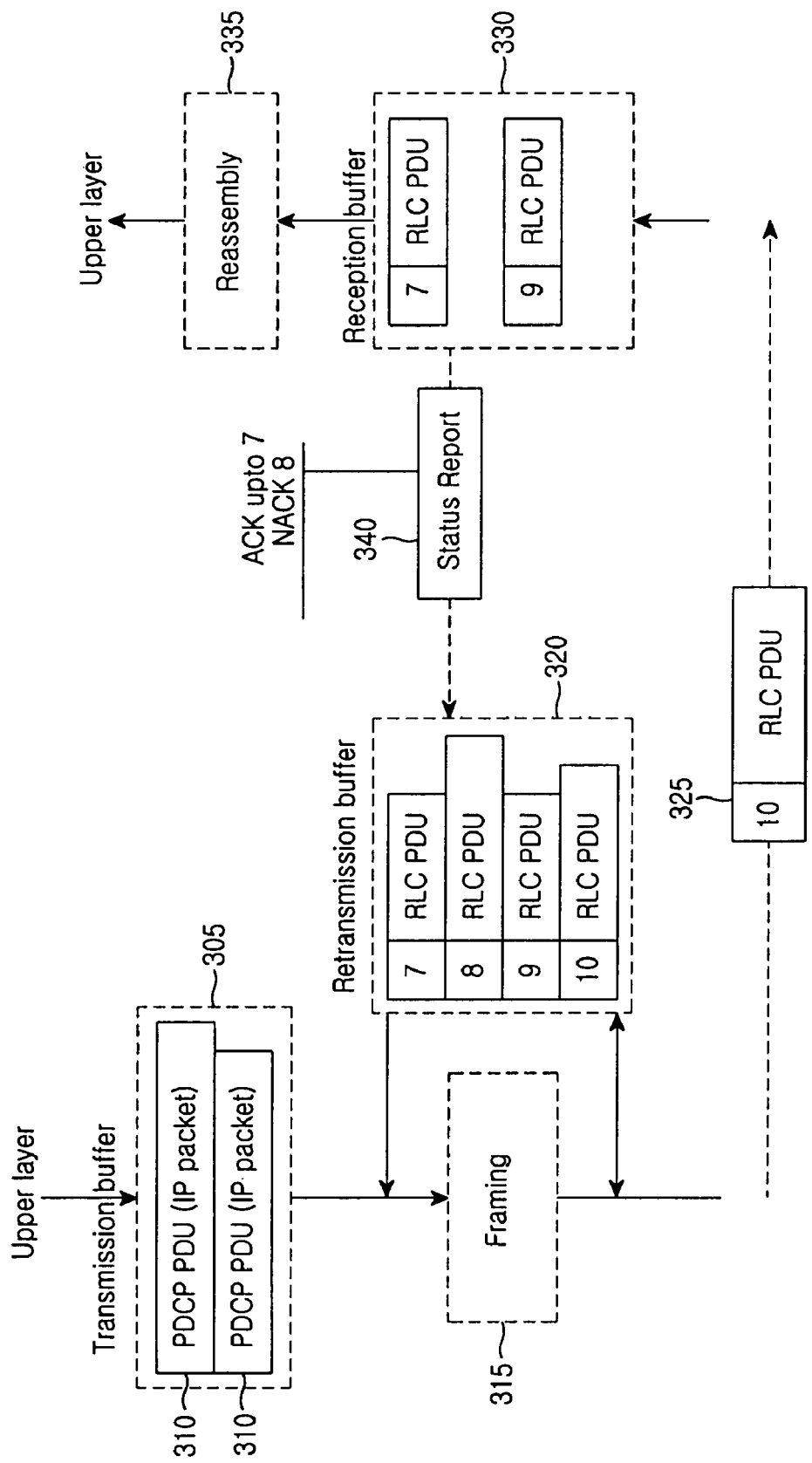
FIG. 3 illustrates an example of an RLC operation.
Figure 4:
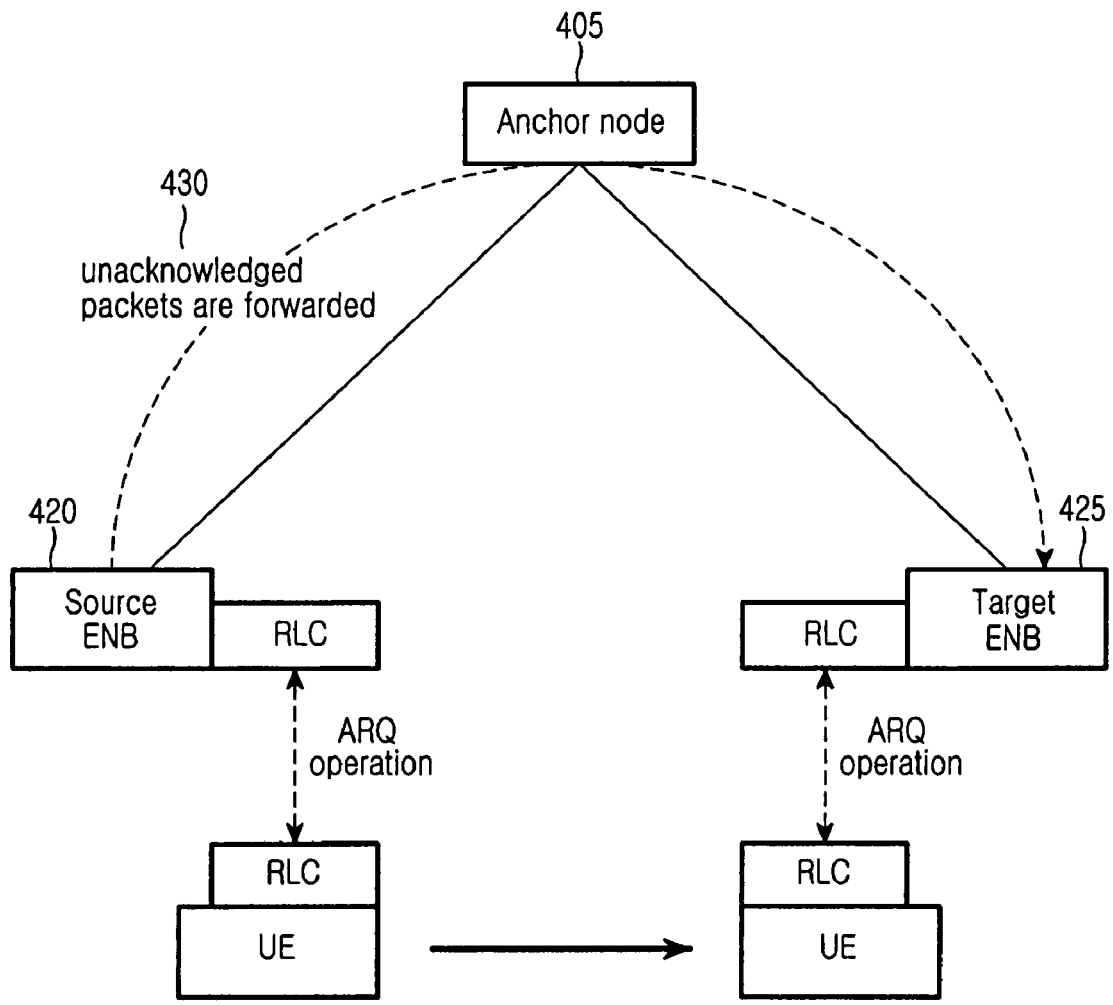
FIG. 4 illustrates a data forwarding process during a handover.
Figure 5:
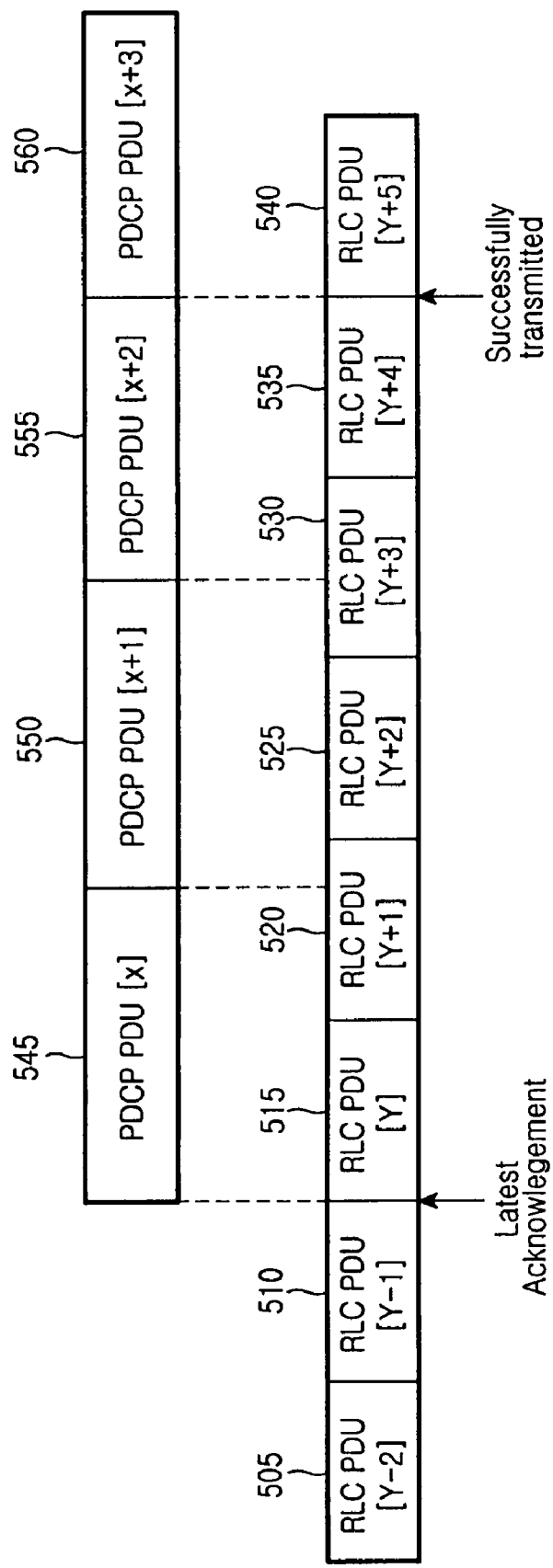
FIG. 5 illustrates a structure of data forwarded during a handover.

FIG. 5 illustrates a structure of data forwarded during a handover.

Referring to FIG. 5, if a source ENB receives an ACK signal for an RLC PDU[Y−1] 510 from a UE at a certain time, the source ENB removes, from a retransmission buffer, RLC PDUs 505 having sequence numbers lower than that of the RLC PDU[Y−1] 510.

Thereafter, the source ENB transmits RLC PDU[Y] 515~RLC PDU[Y+5] 540 according to a normal RLC operation. If handover is performed before the source ENB has successfully received ACK signals for the RLC PDUs 515 to 540, the source ENB, because the source ENB's transmission has already been completed, should forward, to a target ENB, the PDCP PDUs (i.e. PDCP PDU[x] 545, PDCP PDU[x+1] 550, PDCP PDU[x+2] 555) corresponding to the RLC PDUs 515 to 540 so that the UE will probably be successfully received. If the RLC PDUs 515 to 540 have been successfully transmitted and the source ENB has received, from the UE, ACK signals indicating that the UE has successfully received up to the RLC PDU[Y+5] 540 immediately before the handover is performed, the source ENB has no need to forward the PDCP PDUs 545 through 555 to the target ENB.

The present invention allows the UE to send a status report to the source ENB immediately before handover happens, based on the fact that the un-ACKed transmitted RLC PDUs have been probably successfully transmitted. In this way, it is possible to minimize the amount of data forwarded from the source ENB to the target ENB.

First Embodiment

Figure 6:
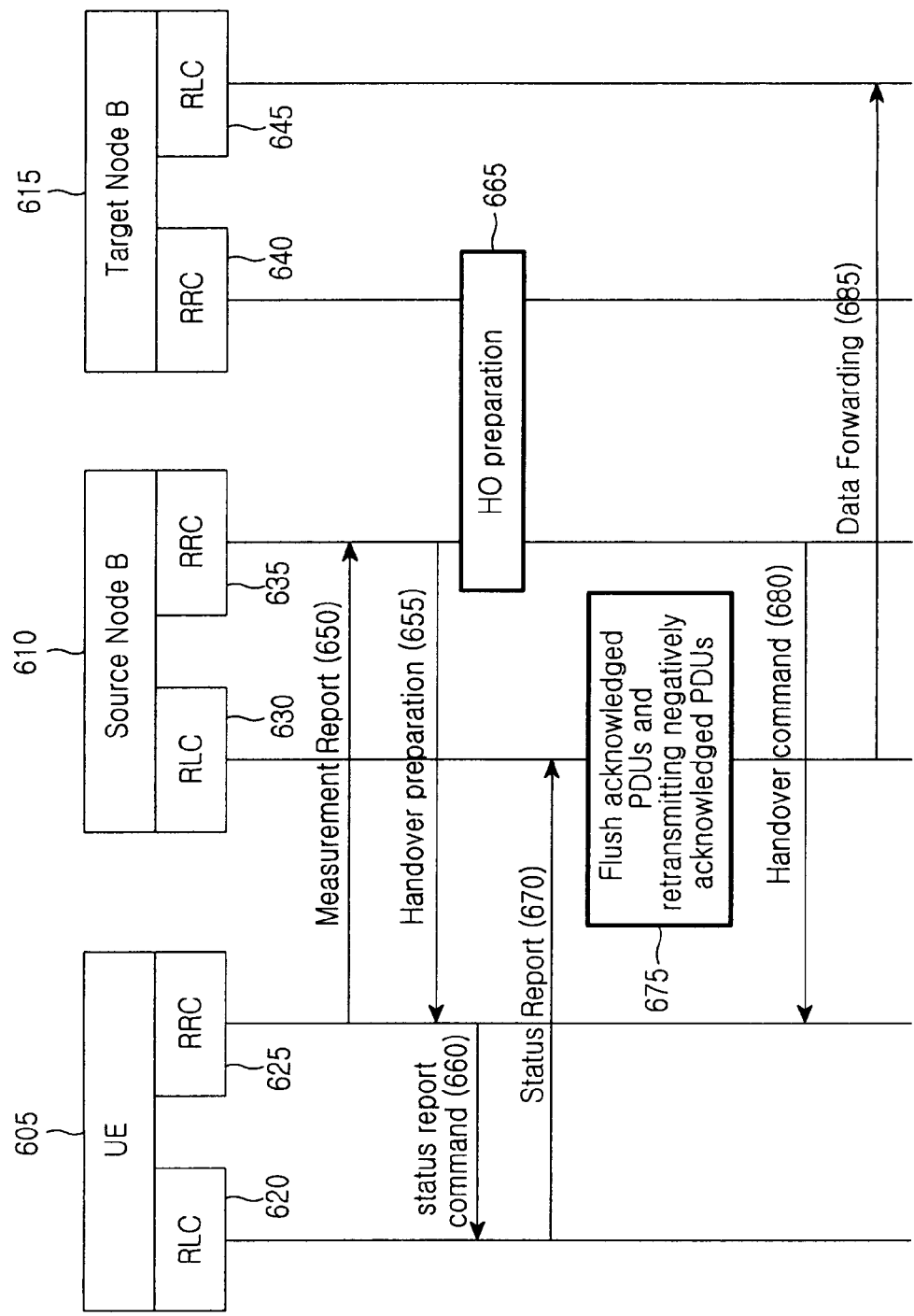
FIG. 6 illustrates the entire operation according to a first embodiment of the present invention.

FIG. 6 illustrates an operation of a system according to a first embodiment of the present invention.

Referring to FIG. 6, a UE 605 measures, for example, a common pilot channel of an adjacent cell using a predetermined scheme. If the measurement result satisfies a predetermined threshold, the UE 605 sends a measurement report to a source ENB 610 in step 650.

The measurement report can include, for example, 'best cell change' information indicating that a particular one of the adjacent cells is superior in quality than the current cell, and upon a receipt of the 'best cell change' report from the UE 605, the source ENB 610 can determine a handover to the best cell.

Conventionally, if the handover is determined, a target ENB 615 performs a HandOver (HO) preparation process, and after the preparation for the handover is completed, the source ENB 610 sends a handover command to the UE 605. However, in the first embodiment of the present invention, if the handover is determined, the source ENB 610 additionally sends, in step 655, to the UE 605, a message indicating the fact that the handover is imminent, before the target ENB 615 performs the handover preparation process.

The handover-related control messages are generally processed by a so-called Radio Resource Control (RRC) control layer, and an RRC 635 of the source ENB 610 sends in step 655 an RRC message called a 'handover preparation' message to an RRC 625 of the UE 605. The handover preparation message can include transmission resource information to be used by the UE 605 for sending an RLC status report.

Upon receiving of the handover preparation message, the RRC 625 of the UE 605 commands in step 660 the RLC entities 620, configured at the corresponding time, to generate and send an RLC status report because the handover is imminent. For convenience, the command will be referred to as a 'status report command'.

Upon receiving of the status report command, the RLC entities 620 each generate a status report, or reception status information up to the corresponding time, according to a predetermined method, and send the status report to the source ENB 610 in step 670. If transmission resources for sending of the status report are allocated using the handover preparation message, the UE 605 sends the status report over the allocated transmission resources. The status report contains, for example, sequence numbers of RLC PDUs successfully received up to the corresponding time, and sequence numbers of RLC PDUs were not successfully received. The term 'RLC PDUs failed to be successfully received' as used herein refers to the RLC PDUs having missing sequence numbers when the successfully received RLC PDUs are reordered in the reception buffer according to the sequence numbers.

Upon the receipt of the status reports, RLC entities 630 of the source ENB 610 discard (or flush) from a retransmission buffer the successfully received RLC PDUs reported by the RLC entities 620 of the UE 605. Further, the RLC entities 630 of the source ENB 610 flush from the retransmission buffer the PDCP PDUs, all associated RLC PDUs of each of which were received, i.e. ACKnowledged (ACKed) PDCP PDUs. In addition, the RLC entities 630 of the source ENB 610 retransmit in step 675 to the UE 605 the RLC PDUs failed to be successfully received, reported by the RLC entities 620 of the UE 605. In the case where one PDCP PDU is composed of several RLC PDUs, and only one of the RLC PDUs is failed to be received and all of the other RLC PDUs are received, if the source cell retransmits the reception-failed (or missing) RLC PDU, the target cell has no need to retransmit the RLC PDUs. However, if the source cell does not retransmit the missing RLC PDU, the target cell should retransmit all RLC PDUs constituting the PDCP PDU. Therefore, it is preferable for the source cell to retransmit the missing RLC PDU in terms of the efficiency of wireless resources.

As described above, the source ENB 610 performs the handover preparation process with the target ENB 615 in step 665, separately from steps 660, 670 and 675. The handover preparation process is a process for allowing the UE 605 to immediately resume the communication in a new cell when the UE 605 makes a handover to the new cell, and for example, the handover preparation process can include a process of setting up RLC entities and a MAC entity.

The source ENB 610, after its handover preparation process with the target ENB 615 is completed, sends a handover command to the UE 605 to allow the UE 605 to perform a handover to the target cell in step 680. Thereafter, in step 685, the source ENB 610 forwards the un-ACKed PDCP PDUs to the target ENB 615.

According to the first embodiment of the present invention, after receiving the status reports from the UE 605 in step 670, the source ENB 610 flushes the successfully transmitted RLC PDUs and PDCP PDUs, thereby minimizing the number of PDCP PDUs being forwarded to the target ENB 615 in step 685.

Figure 7:
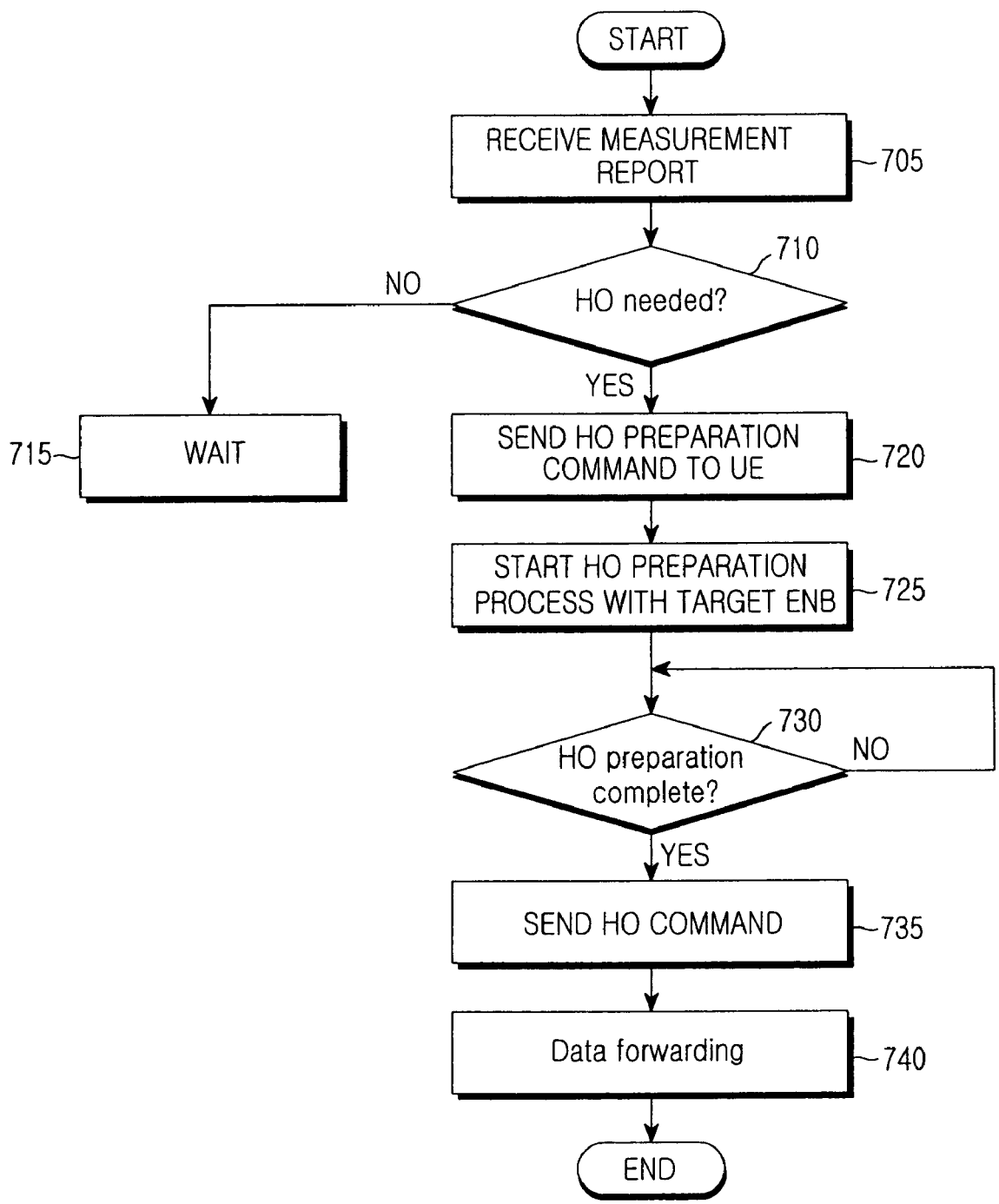
FIG. 7 illustrates an ENB's operation according to the first embodiment of the present invention.

FIG. 7 illustrates a source ENB's operation of performing a handover according to the first embodiment of the present invention.

Upon receiving a measurement report from a UE in step 705, a source ENB determines in step 710 whether to perform HandOver (HO) based on the measurement report and adjacent cell condition reported by the UE.

For example, if the UE sends a report indicating a change in the cell having the best measured quality, the source ENB prepares to allow the UE to perform a handover to the cell having the best measured quality.

The source ENB, if it determines not to perform a handover in step 710, proceeds to step 715 where it waits until a new measurement report is received from the UE. However, if the source ENB determines to perform a handover, it proceeds to step 720.

In step 720, the source ENB sends a handover preparation command to the UE. In step 725, the source ENB performs a handover preparation process with a target ENB. The source ENB can previously allocate the transmission resources that the UE can use to send a status report, using the handover preparation command.

After completing the handover preparation process with the target ENB upon receipt of a signal indicating completion of the handover preparation from the target ENB, the source ENB sends a handover command to the UE in step 735, and forwards 'non-transmitted PDCP PDU' and 'un-ACKed transmitted PDCP PDU' to the target ENB in step 740.

Figure 8:
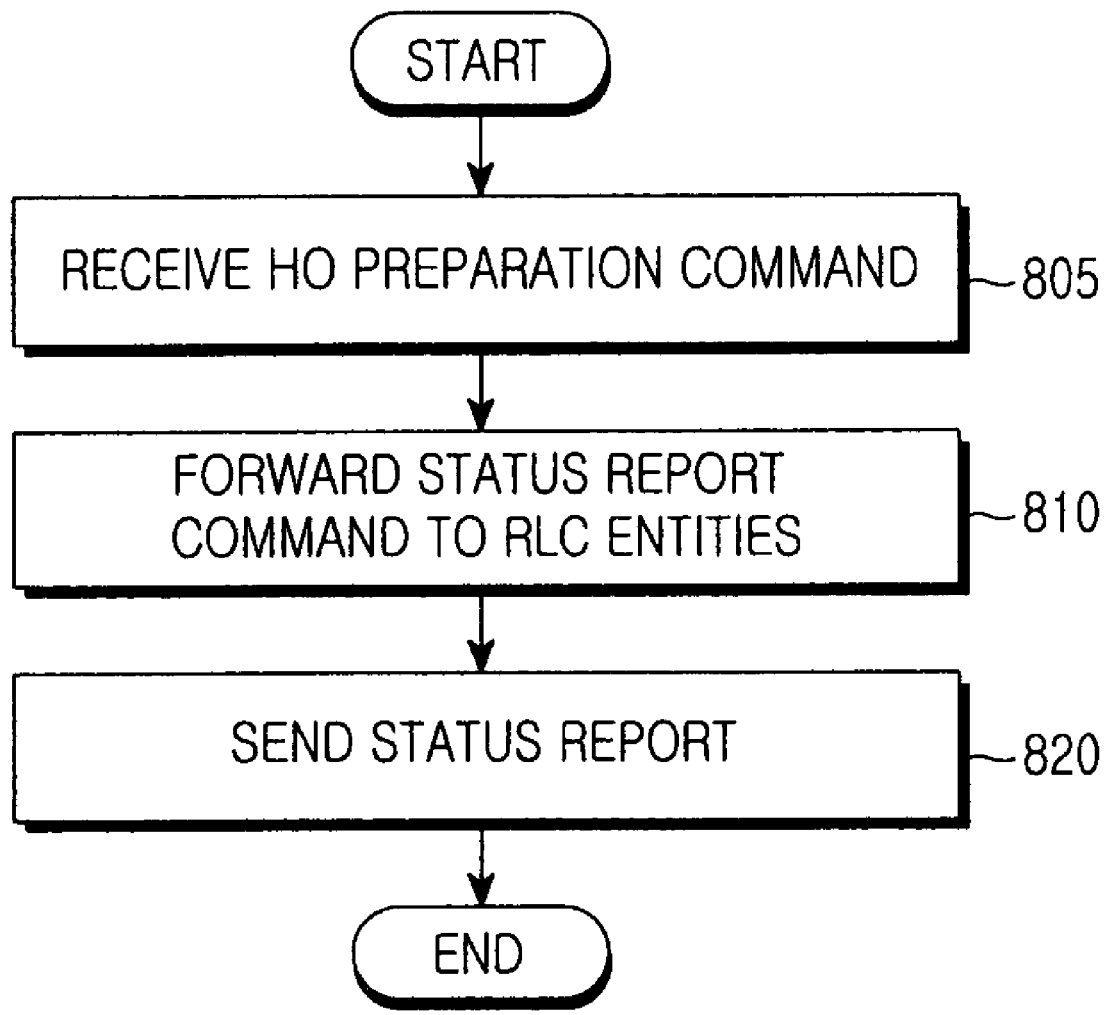
FIG. 8 illustrates a UE's operation according to the first embodiment of the present invention.

FIG. 8 illustrates a UE's operation of receiving a 'handover preparation' signal in a handover process according to the first embodiment of the present invention.

Upon receiving of a handover preparation command from a source ENB in step 805, an RRC of a UE forwards a status report command to RLC entities configured at a corresponding time in step 810. The status report command is a command to generate and send a status report to the source ENB because the handover is imminent.

Upon receiving of the status report command from the RRC, the RLC entities generate status reports containing RLC PDU reception statuses at the corresponding time and send the status reports to the source ENB in step 820. In this case, if there are transmission resources allocated by the handover preparation command, the UE sends the status reports using the allocated transmission resources.

Second Embodiment

A description will now be made of a handover method according to a second embodiment of the present invention.

The second embodiment of the present invention provides a scheme in which a UE spontaneously recognizes the fact that the handover will be performed immediately, and sends status reports.

Figure 9:
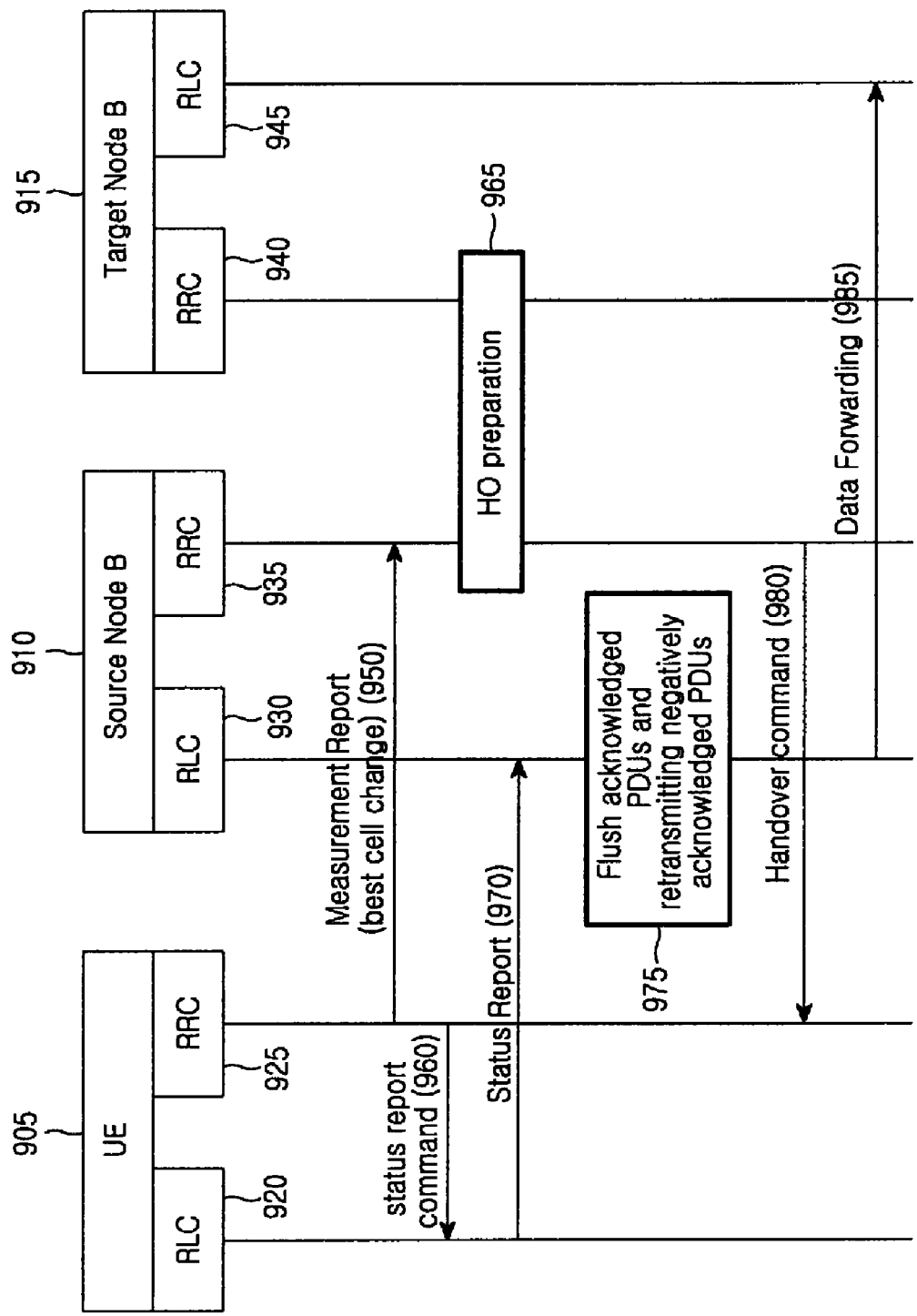
FIG. 9 illustrates the entire operation according to a second embodiment of the present invention.

FIG. 9 illustrates an operation of the entire system according to the second embodiment of the present invention.

Referring to FIG. 9, a UE 905 measures signal strength of, for example, a common pilot channel from an adjacent cell using a predetermined method. If the measurement result satisfies a predetermined threshold, the UE 905 sends a measurement report to a source ENB 910 in step 950.

The measurement of the signal strength is generally performed for mobility support of the UE, and the ENB can send the UE a command to perform various types of measurement and measurement report schemes according to types of the mobility supports. For example, if at least one of the adjacent cells has a channel quality exceeding a threshold, the ENB can command the UE to report the measurement result, or if at least one of the adjacent cells has a channel quality higher than a channel quality of the current cell, the ENB can command the UE to report the measurement result.

In the second embodiment of the present invention, the UE and the network previously recognized which of the various types of the measurement reports had a high handover-causing possibility. The measurement report having the high handover-causing possibility can be defined separately for each operator according to the policies of operators or the network operation methods. Generally, the measurement report such as 'best cell change' is high in the handover-causing possibility.

After sending the measurement report, if the sent measurement report is a measurement report having the high handover-causing possibility, an RRC 925 of the UE 905 commands in step 960 the RLC entities configured at the corresponding time to generate and send RLC status reports because the handover is imminent. From the standpoint of the RRC, the sending of the measurement report means forwarding the measurement result to a lower layer.

The source ENB 910 can notify, in advance, the UE 905 which status report command it should forward to RLC entities after the UE 905 sends the measurement report, i.e. which measurement reports are included in the measurement reports having the high handover-causing possibility. Alternatively, types of the measurement reports for which the source ENB 910 should forward the status report command can be defined, in advance, between the ENB and the UE. The 'best cell change' report can be the typical example of the measurement report having the high handover-causing possibility.

Upon receiving of the status report command, RLC entities 920 of the UE 905 generate status reports, or reception status information up to the corresponding time, and send the status reports to the source ENB 910 in step 970. The status reports can contain, for example, sequence numbers of the RLC PDUs successfully received up to the corresponding time, and sequence numbers of the RLC PDUs failed to be successfully received. The term 'RLC PDUs failed to be successfully received' as used herein refers to the RLC PDUs having missing sequence numbers corresponding to the empty sequence numbers when the successfully received RLC PDUs are reordered in the reception buffer according to the sequence numbers.

Upon receipt of the status reports, RLC entities 930 of the source ENB 910 flush, from a retransmission buffer, the successfully received RLC PDUs reported by the RLC entities 920 of the UE 905, and the PDCP PDUs, all associated RLC PDUs of each of which were received. In addition, the RLC entities 930 of the source ENB 910 retransmit in step 975 to the UE 905 the RLC PDUs failed to be successfully received, reported by the RLC entities 920 of the UE 905.

The source ENB 910 performs the handover preparation process with the target ENB 915 in step 965, separately from steps 960, 970 and 975. The handover preparation process is a process for allowing the UE 905 to immediately resume the communication in a new cell when the UE 905 makes a handover to the new cell, and for example, the handover preparation process can include a process of setting up RLC entities and a MAC entity.

The source ENB 910, after its handover preparation process with the target ENB 915 is completed, sends a handover command to the UE 905 to allow the UE 905 to perform a handover to the target cell in step 980. Thereafter, in step 985, the source ENB 910 forwards the un-ACKed PDCP PDUs to the target ENB 915.

The order of sending messages by the UE in FIG. 9 is a mere example of describing a before-and-after relationship of the UE operation, and the messages can be sent in a different order. For example, step 950 of sending the measurement result having the high handover-causing possibility and step 970 of sending the status report derived from generation of the measurement result having the high handover-causing possibility can be performed substantially at the same time. As described above, after forwarding the measurement report having the high handover-causing possibility to the lower layer, the RRC entity commands the RLC entities to generate and send status reports. In this case, the measurement report is stored in a transmission buffer of Layer 2 until transmission resources are allocated from a scheduler. Because the receiving of the transmission resources allocated from the scheduler is a process of sending a predefined signal over a random access channel and then receiving a response thereto, the time for which the measurement report is stored in the transmission buffer of Layer 2 can amount to several to several tens of milliseconds (msecs). However, because the time for which the RLC entities generate the status reports is very short, there is actually a high possibility that the measurement report and the status reports will be sent together.

As described above, the second embodiment of the present invention receives the status reports in step 970 and flushes the recently successfully received RLC PDUs and PDCP PDUs depending on the status reports, thereby minimizing the number of PDCP PDUs being forwarded in step 985.

Figure 10:
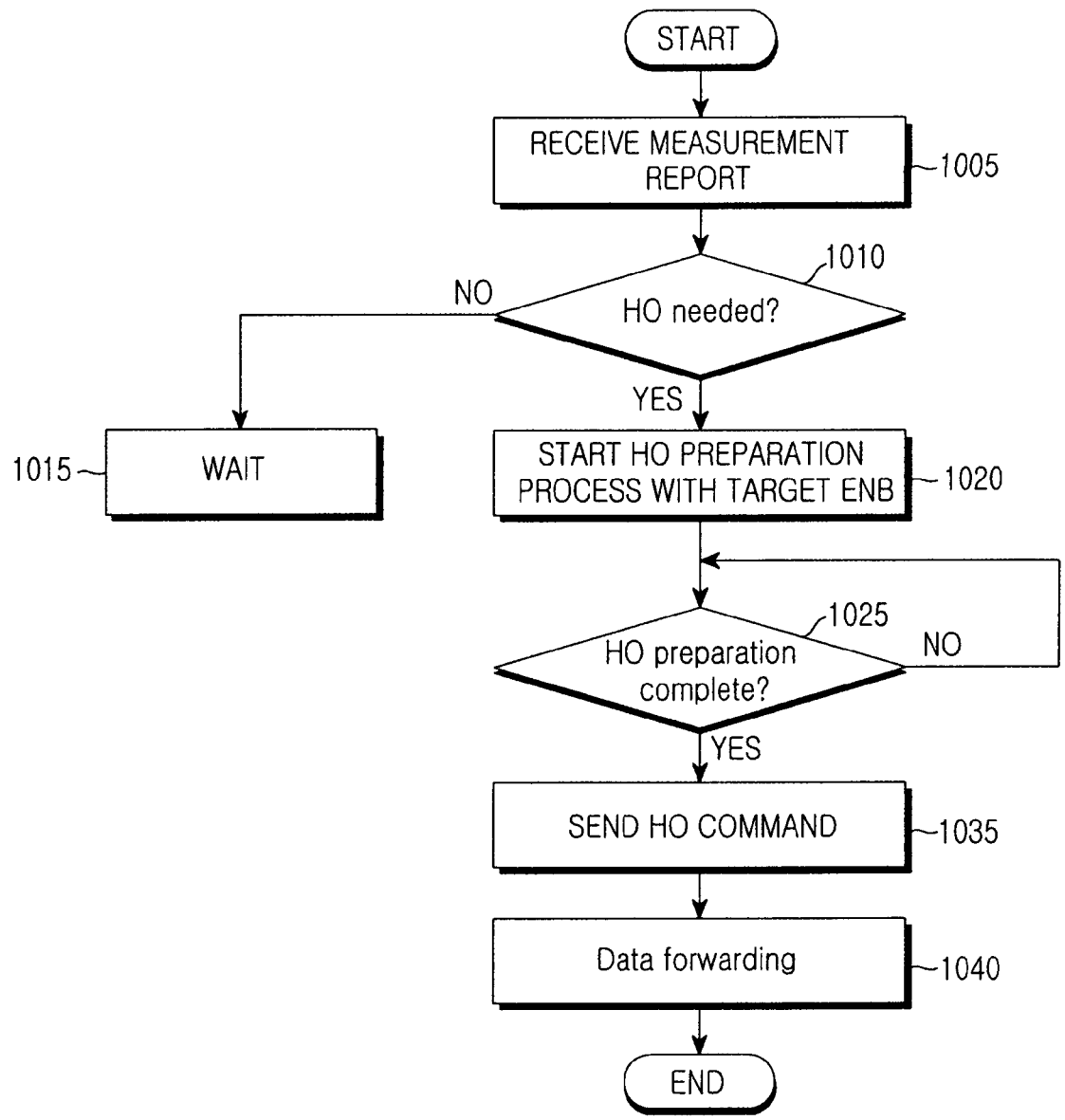
FIG. 10 illustrates an ENB's operation according to the second embodiment of the present invention.

FIG. 10 illustrates a source ENB's operation of performing a handover according to the second embodiment of the present invention.

Upon receipt of a measurement report from a UE in step 1005, a source ENB determines in step 1010 whether to perform a handover based on the measurement report and adjacent cell condition reported by the UE.

For example, if the UE sends a report indicating a change in the cell having the best measured quality, the source ENB prepares to allow the UE to perform a handover to the cell having the best measured quality.

If the source ENB determines not to perform a handover in step 1010, proceeds to step 1015 where the source ENB waits until a new measurement report is received from the UE. However, if the source ENB determines to perform a handover, it proceeds to step 1020.

In step 1020, the source ENB performs a handover preparation process with a target ENB.

After completing the handover preparation process with the target ENB upon receipt of a signal indicating completion of the handover preparation from the target ENB in step 1025, the source ENB sends a handover command to the UE in step 1035, and forwards 'non-transmitted PDCP PDU' and 'un-ACKed transmitted PDCP PDU' to the target ENB in step 1040.

Figure 11:
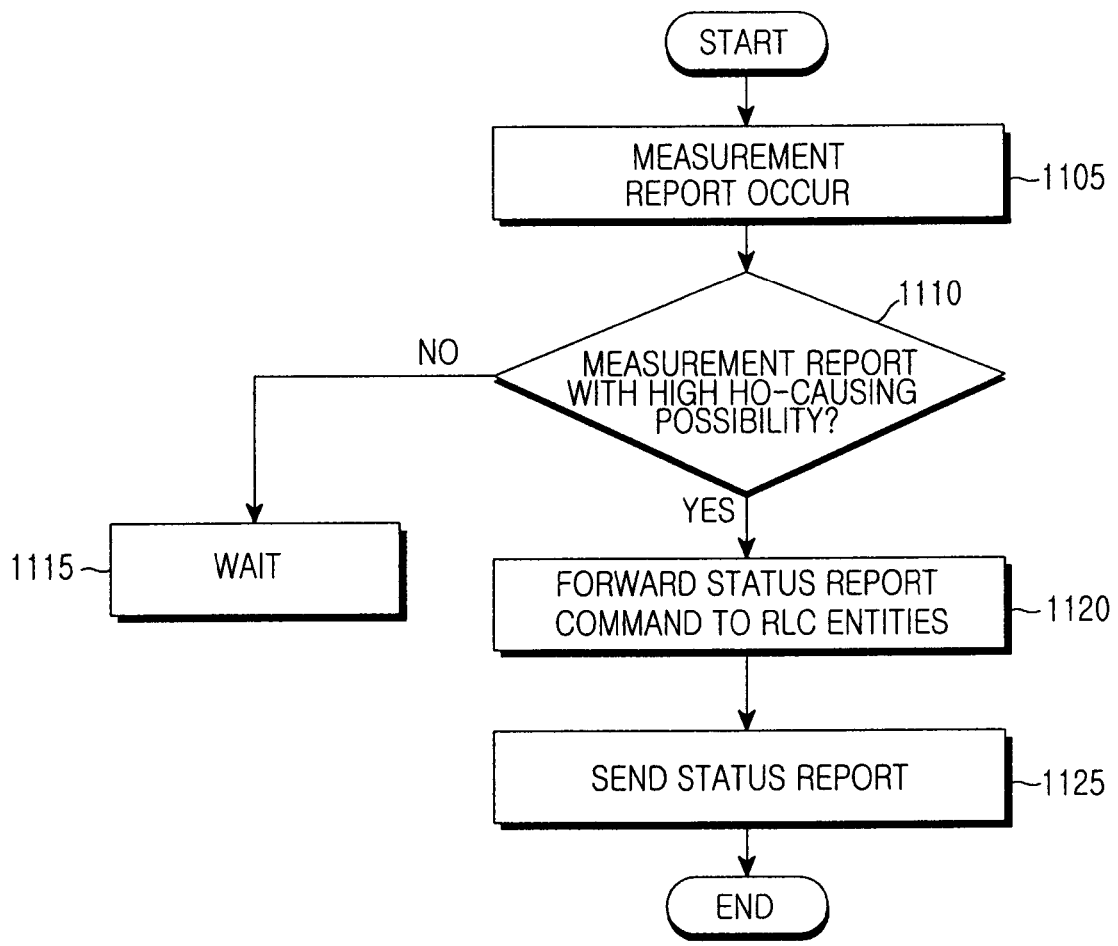
FIG. 11 illustrates a UE's operation according to the second embodiment of the present invention.

FIG. 11 illustrates a UE's operation in a handover process according to the second embodiment of the present invention.

In step 1105, a UE generates a measurement report while measuring channel quality of adjacent cells, if the measurement report generation condition predetermined by the ENB is satisfied.

In step 1110, the UE determines whether the measurement report is a measurement report having a high handover-causing possibility, and sends the measurement report to the ENB (source ENB). For example, if the 'best cell change' report is defined as a measurement report having the high handover-causing possibility, the UE determines whether the measurement report generated in step 1105 is a 'best cell change' report, and then sends the measurement report to the source ENB. From the standpoint of the RRC, sending the measurement report to the ENB means forwarding the measurement result to a lower layer. Thereafter, the measurement report is sent to the ENB using a predetermined lower layer operation.

If it is determined in step 1110 that the sent measurement report is not a measurement report having a high handover-causing possibility, the UE proceeds to step 1115 where it waits until a new measurement report is received. However, if it is determined that the sent measurement report is a measurement report having a high handover-causing possibility, the UE proceeds to step 1120.

In step 1120, an RRC of the UE forwards a status report command to the RLC entities configured at the corresponding time. The status report command is a command to generate and send a status report to the source ENB because the handover is imminent.

Upon receipt of the status report command from the RRC, the RLC entities generate in step 1125 status reports containing the RLC PDU reception status at a corresponding time, and send the generated status reports to the ENB. The status reports are sent to the ENB through a predetermined process. The status reports and the measurement reports having the high handover-causing possibility can be sent over the same transmission resources at the same time.

Figure 12:
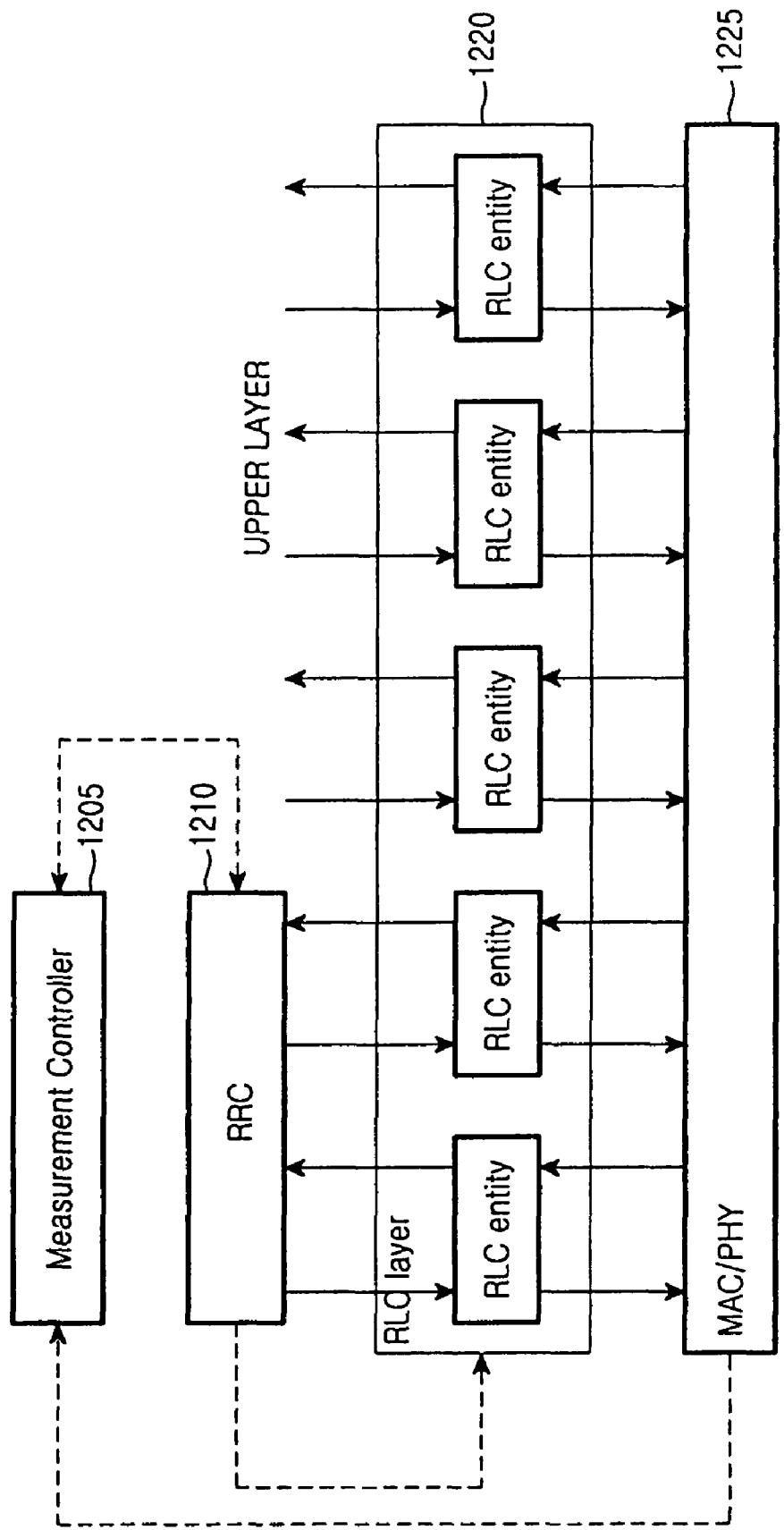
FIG. 12 illustrates a structure of a UE apparatus according to the first and second embodiments of the present invention.

FIG. 12 illustrates a structure of a UE apparatus according to the first and second embodiments of the present invention.

Referring to FIG. 12, a UE according to an embodiment of the present invention includes a measurement controller 1205, an RRC 1210, an RLC layer 1220, and a MAC/PHY 1225.

The measurement controller 1205 controls a received signal strength measurement process of the UE, and forwards the measurement result to be contained in a measurement report to the RRC 1210 if a measurement report condition is satisfied.

Particularly, in the second embodiment of the present invention, the measurement controller 1205 recognizes a type of a 'measurement report having a high handover-causing possibility', and if the 'measurement report having a high handover-causing possibility' occurs, the measurement controller 1205 reports it to the RRC 1210.

Upon receiving the measurement result reported from the measurement controller 1205, the RRC 1210 generates an RRC message, called a measurement report, using the received measurement result, and sends the measurement report to the ENB. In addition, if the measurement controller 1205 reports occurrence of the 'measurement report having a high handover-causing possibility', the RRC 1210 commands RLC entities of the RLC layer 1220, configured at a corresponding time, to generate and send status reports. Further, upon receiving a handover preparation message from an RRC of the ENB, the RRC 1210 commands the RLC entities of the RLC layer 1220, configured at the corresponding time, to generate and send status reports.

The RLC layer 1220 is a set of RLC entities in charge of reliable transmission/reception of upper layer data or RRC messages, and the MAC/PHY 1225 is a device in charge of transmission/reception of RLC PDUs.

Third Embodiment

A third embodiment of the present invention provides a method and apparatus in which, after sending a measurement report having a high handover-causing possibility, a UE sends a buffer status report for data retransmission to a scheduler of an ENB.

Figure 13:
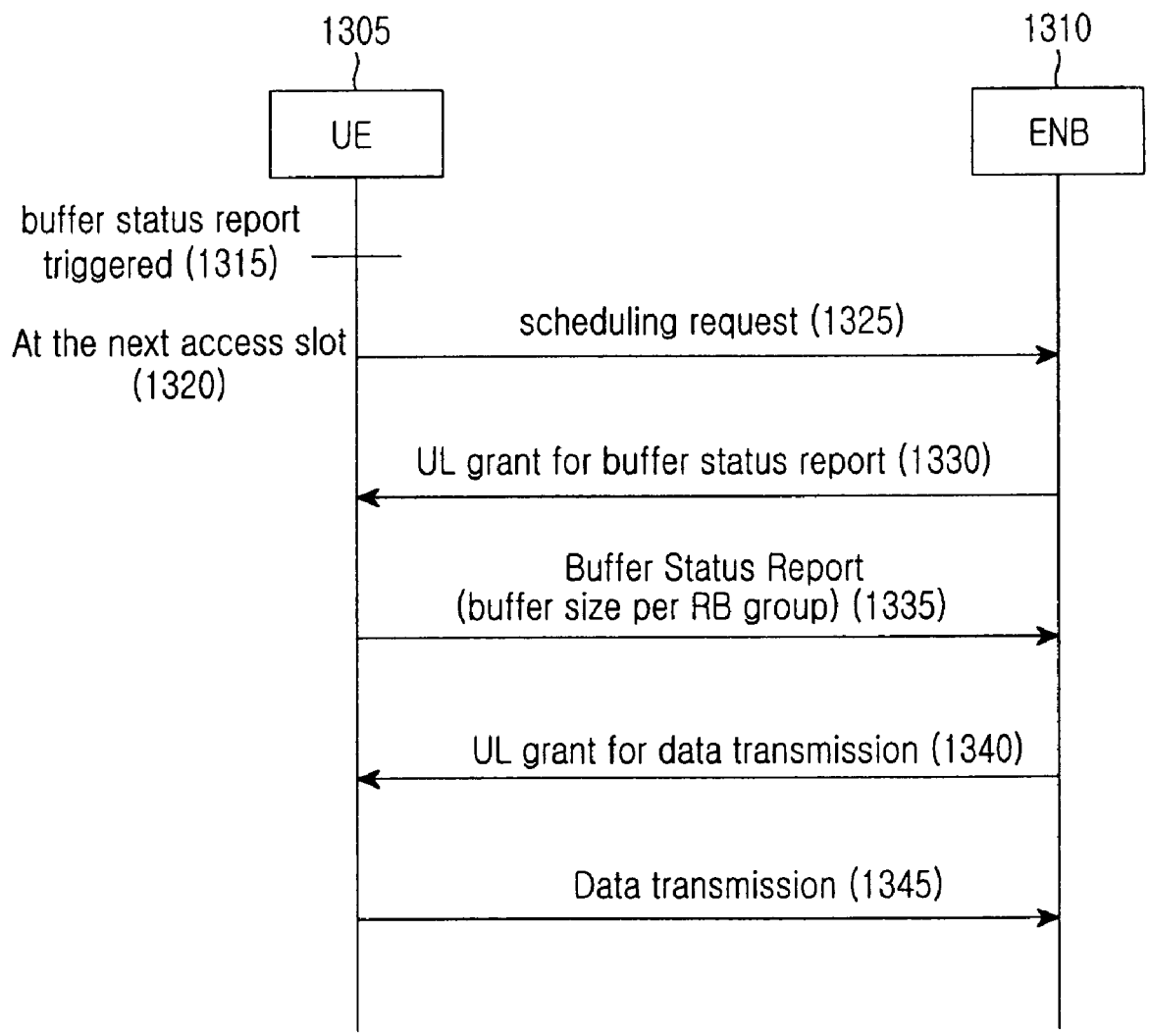
FIG. 13 illustrates the conventional transmission resource allocation process.

FIG. 13 illustrates the general buffer status report and transmission resource allocation process.

Referring to FIG. 13, in the mobile communication system including a UE 1305 and an ENB 1310, if a predetermined condition is satisfied, the UE 1305 starts (triggers) a buffer status report procedure. The predetermined condition is referred to as a 'buffer status report procedure triggering condition'. The most typical one of the buffer status report procedure triggering methods is the periodic method. In this method, the UE 1305 sends a buffer status report and re-triggers the buffer status report after a lapse of a predetermined time.

If the buffer status report procedure is triggered, the UE 1305 first sends a so-called scheduling request signal to the ENB 1310. The scheduling request is a signal used to request the ENB 1310 to allocate transmission resources over which the UE 1305 will send the buffer status report. The scheduling request can be sent over a periodically established specific physical channel, and for convenience, the periodically established specific physical channel, over which the scheduling request can be sent, will be referred to herein as an access slot. If the buffer status report procedure is triggered in step 1315, the UE 1305 sends in step 1320 a scheduling request over the closest next access slot.

Upon receiving the scheduling request, the ENB 1310 allocates in step 1330 UpLink (UL) transmission resources to allow the UE 1305 to send a buffer status report. In step 1335, the UE 1305 sends a buffer status report using the allocated transmission resources.

In step 1340, the ENB 1310 allocates UL transmission resources for data transmission to the UE 1305 taking into account the amount of data stored in the UE 1305, or the information contained in the buffer status report, and the priority of the data. In step 1345, the UE 1305 transmits data using the allocated transmission resources.

This buffer status report scheme works well in general data transmission, but requires a relatively long time until allocated transmission resources for data transmission are allocated, so this scheme is unsuitable to be applied for fast data transmission.

Therefore, the third embodiment of the present invention provides a new buffer status report and transmission resource allocation process to be applied for sending of the measurement report having a high handover-causing possibility.

Figure 14:
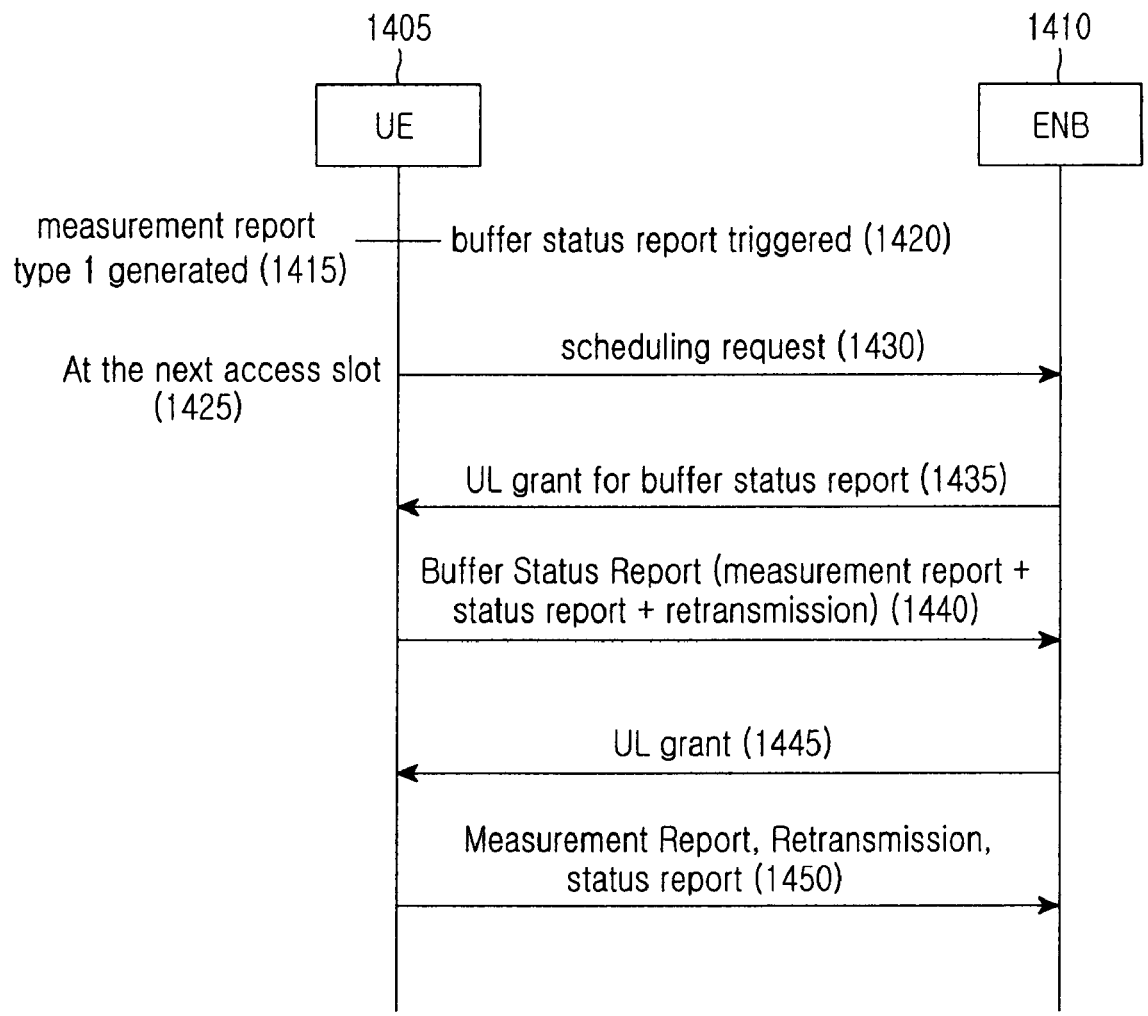
FIG. 14 illustrates the entire operation according to a third embodiment of the present invention.

FIG. 14 illustrates the entire operation of the mobile communication system according to the third embodiment of the present invention.

Referring to FIG. 14, in the mobile communication system including a UE 1405 and an ENB 1410, if a measurement report having a high handover-causing possibility occurs in step 1415, the UE 1405 starts (triggers) in step 1420 a buffer status report procedure, considering that a buffer status report procedure triggering condition is satisfied. For convenience, the measurement report having a high handover-causing possibility will be referred to herein as a 'type-1 measurement report'.

If the type-1 measurement report occurs in this way, the UE 1405 immediately starts the buffer status report procedure without waiting for the expiration of, for example, a timer, thereby sending the type-1 measurement report as fast as possible.

If the buffer status report procedure is triggered, the UE 1405 sends in step 1430 a scheduling request for a buffer status report over the closest access slot.

Upon receiving the scheduling request, the ENB 1410 allocates in step 1435 UL transmission resources to allow the UE 1405 to send a buffer status report. In step 1440, UE 1405 sends a buffer status report to the ENB 1410 using the allocated transmission resources.

If the type-1 measurement report occurs, the UE 1405 includes the following information in the buffer status report generated when the handover is imminent, determining that the handover is imminent:

A size of the type-1 measurement report, or a size of the data stored in a buffer of a radio bearer or a radio bearer group to which the type-1 measurement report belongs.

A sum of sizes of downlink status reports by the RLC entities configured at the time.

A sum of uplink RLC PDUs to be retransmitted by the RLC entities configured at the time.

According to the third embodiment of the present invention, if a type-1 measurement report having a high handover-causing possibility occurs, the UE orders the RLC entities configured at the corresponding time to generate downlink status reports, and the generated downlink status reports are stored in a transmission buffer of the corresponding radio bearer. A second item in the information included in the buffer status report indicates a size of the status reports generated due to the imminence at the handover time.

In LTE, a size of the RLC PDUs is variable according to channel conditions. For example, smaller RLC PDUs are transmitted when the channel condition has a poor quality, and larger RLC PDUs are transmitted when the channel condition has a good quality. At the time when the UE performs handover, because there is a high possibility that the size of the RLC PDUs will be smaller due to the poor channel condition, there is a high possibility that an IP packet capable of having a size of a maximum of 1500 bytes will be transmitted after being divided into several RLC PDUs.

When the handover is performed, the UE reconfigures RLC entities, and resumes the transmission of RLC PDUs in a new cell using the reconfigured RLC entities. In this case, the IP packets, even a part of each of which was failed to be transmitted in the old cell, are all retransmitted in the new cell. For example, in a case where an arbitrary IP packet is transmitted after being divided into n RLC PDUs, if at least one of the n RLC PDUs had failed to be transmitted in the source cell, the entire IP packet is retransmitted in the target cell. Because the transmission failure of some RLC PDUs causes the retransmission of the entire IP packet, it is preferable, in terms of transmission resource efficiency, to complete the retransmission of the RLC PDUs retransmission-required before performing the handover, at the time that the handover is imminent.

Therefore, the third embodiment of the present invention includes the information on the retransmission-required RLC PDUs in the buffer status report generated in the state where the handover is imminent, thereby allowing a scheduler of the ENB to allocate, to the UE, transmission resources for the retransmission so that the UE can complete the retransmission of the RLC PDUs. The term 'retransmission-required RLC PDUs' as used herein refers to the RLC PDUs that have not yet been retransmitted even though a request for their retransmission to an RLC reception apparatus, or a lower layer, of the ENB was received. A third item in the information included in the buffer status report is a sum of sizes of the retransmission-required RLC PDUs.

Upon receiving the buffer status report, the ENB 1410 allocates, in step 1445, UL transmission resources so that the UE 1405 can transmit measurement report, downlink status report, and retransmission-required uplink RLC PDUs. In step 1450, the UE 1405 transmits the measurement report, the downlink status report, and the retransmission-required uplink RLC PDUs using the allocated transmission resources.

Figure 15A:
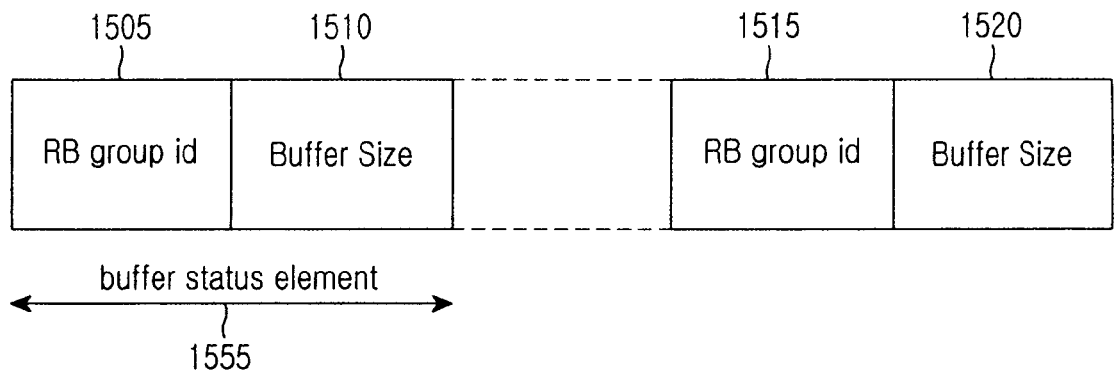
FIG. 15A illustrates a format of the general buffer status report.
Figure 15B:
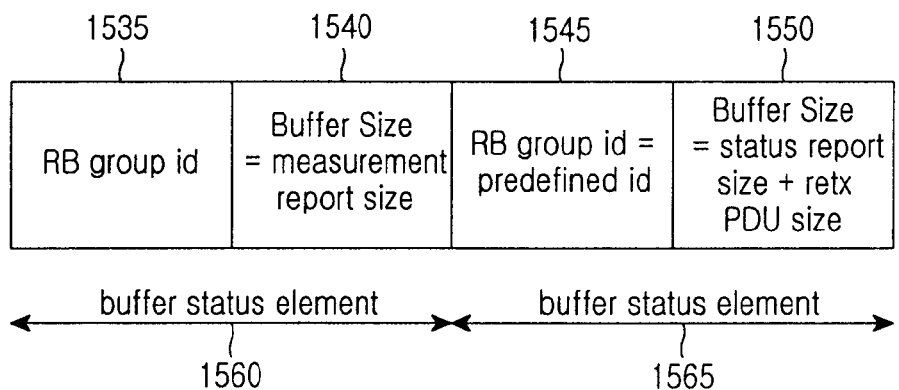
FIG. 15B illustrates a format of a buffer status report according to the third embodiment of the present invention.

FIGS. 15A and 15B illustrate structures of buffer status reports. Shown in FIG. 15A is a structure of the general buffer status report, and shown in FIG. 15B is a structure of a buffer status report transmitted by a UE whose handover is imminent according to the third embodiment of the present invention.

Referring to FIG. 15A, the general buffer status report is composed of multiple buffer status elements 1555, and one buffer status element indicates a buffer status of one radio bearer or one radio bearer group.

Multiple radio bearers can be configured in one UE and a transmission buffer exists for every radio bearer. If the buffer status is reported separately for each radio bearer, the amount of the buffer status report can be over-excessive. Thus, a scheme for reducing the amount of the buffer status report can group the radio bearers having the similar service quality or priority into one radio bearer group in reporting the buffer status. Therefore, in the system reporting the buffer status separately for each radio bearer, the buffer status element indicates a buffer status of one radio bearer, and in the system reporting the buffer status separately for each radio bearer group, the buffer status element indicates a sum of buffer statuses of one radio bearer group. Because the radio bearer and the radio bearer group are equal in that they indicate the units in which the buffer status is reported, the radio bearer and the radio bearer group are used together in the following description.

The buffer status element is composed of an identifier 1505 of a radio bearer group, and buffer size information 1510 indicating the amount of data stored in a buffer of the radio bearer group. If several radio bearer groups are set up in an arbitrary UE, several buffer status elements are included in one buffer status report. In the general case, the UE generates a buffer status report by including therein buffer status of all radio bearer groups in which data to be transmitted at a corresponding time is stored, and then sends the generated buffer status report.

Unlike the general buffer status report, the buffer status report transmitted immediately before the handover includes only the type-1 measurement report, the status report, and the information on uplink RLC PDUs to be retransmitted (hereinafter referred to as 'retransmission-scheduled uplink RLC PDUs').

Generally, the Radio Bearer (RB) groups are set according to the priorities, and can be defined, for example, as shown in Table 1.

TABLE 1

| RB group id | RBs of the group |
| --- | --- |
| RB group 0 | high priority control signaling: RB 1 |
| RB group 1 | low priority control signaling: RB 2 |
| RB group 2 | user plane RB whose priority is in the range of x~y: RB 3, RB 4 |
| RB group 3 | user plane RB whose priority is in the range of w~z: RB 5, RB 6, RB 7 |

When the RB groups are established according to priorities of RBs as stated above, status reports or retransmission-scheduled RLC PDUs of RBs belonging to different RB groups are contained in a buffer status element of the corresponding RB group, because the priorities of the status reports or the retransmission-scheduled uplink RLC PDUs are equal to the priorities of the corresponding RBs. The status reports or the retransmission-scheduled RLC PDUs are higher in priority than the general RLC PDUs as described above, but there is no way to express this in the common buffer status report. Therefore, the scheduler of the ENB cannot apply this to the scheduling.

Therefore, to solve this problem, the third embodiment of the present invention allows the status report and the retransmission-scheduled RLC PDU to have a predetermined priority other than the priority of the corresponding RB at least while the handover is performed. For example, the third embodiment sets the priority of the status report and the retransmission-scheduled RLC PDU to the highest priority other than the priority of the corresponding RB, thereby having the status report and the retransmission RLC PDU taken into account at the higher priority in the scheduling process.

Referring to FIG. 15B, the buffer status report generated in the state where the handover is imminent, contains, for example, a buffer status element 1560 for a type-1 measurement report, and a buffer status element 1565 for the status report and the retransmission-scheduled RLC PDU. The buffer status element 1560 for the type-1 measurement report contains a radio bearer group identifier 1535 of a radio bearer to which the type-1 measurement report belongs, and a buffer status 1540 of the radio bearer group, and the buffer status element 1560 for the status report and the retransmission RLC PDU contains an identifier 1545 of a radio bearer group corresponding to the priority to be applied to the status report and the retransmission-scheduled RLC PDU, and a buffer status 1550 corresponding to the size obtained by adding up status reports generated in all RBs and retransmission-scheduled RLC PDUs stored in all RBs.

Figure 16:
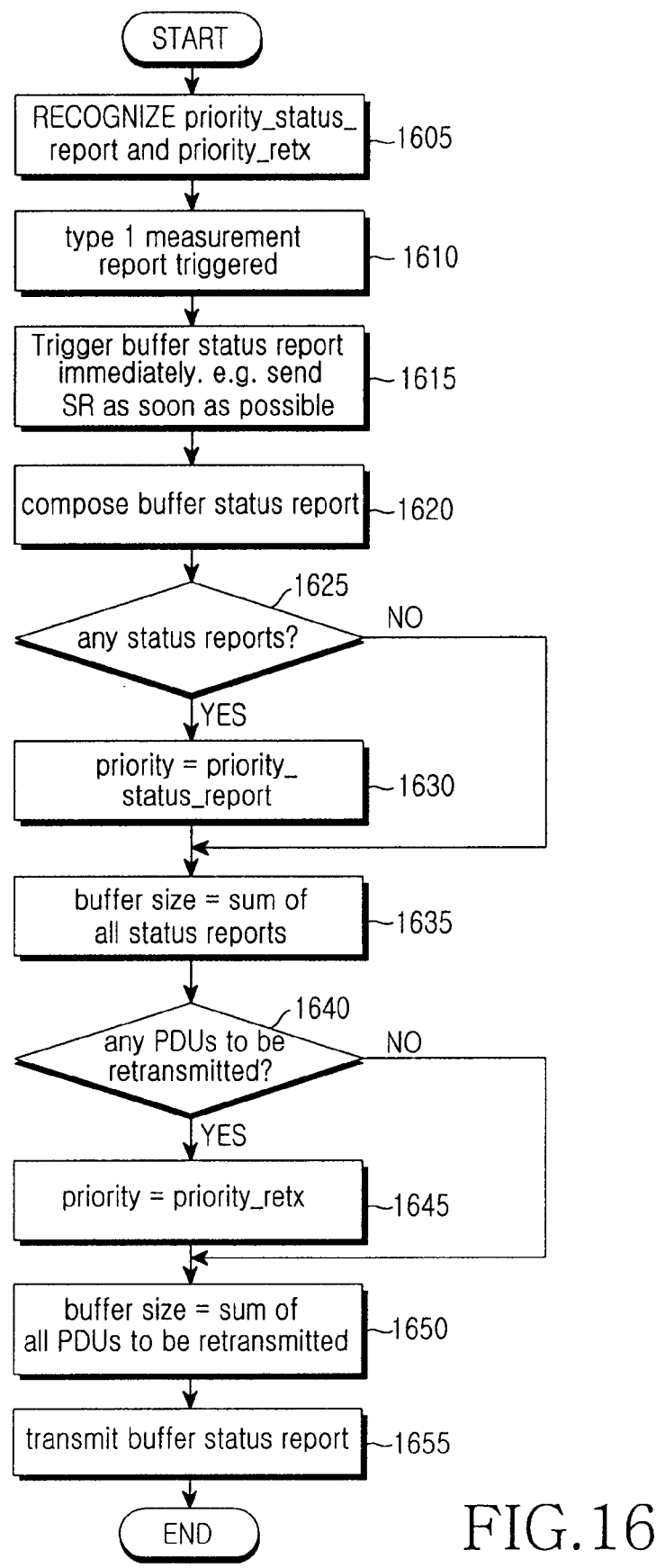
FIG. 16 illustrates a UE's operation according to the third embodiment of the present invention.

FIG. 16 illustrates a UE's operation according to the third embodiment of the present invention.

Referring to FIG. 16, in step 1605, a UE recognizes a priority to be applied to the status report and a priority to be applied to the retransmission-scheduled RLC PDU. This information can be signaled to the UE in a call setup process. Although the two priorities can be equal, any one of the priorities can be higher than the other priority.

After the call setup process is completed, the UE transmits/ receives RLC PDUs according to a predetermined procedure, and measures quality of an adjacent cell. In the course of performing the adjacent cell measurement process, if a type-1 measurement report is triggered in step 1610, the UE immediately starts the buffer status report procedure in step 1615. In other words, the UE sends a scheduling request over the closest next access slot.

In step 1620, the UE configures a buffer status report according to a predetermined scheme. That is, the UE checks the amount of data stored in a corresponding radio bearer group separately for each radio bearer group, and includes the information in an individual buffer status element. The UE determines in step 1625 whether a status report is stored in the radio bearer group buffer. If a status report is stored in the radio bearer group buffer, the UE proceeds to step 1630. However, if no status report is stored in the radio bearer group buffer, the UE proceeds to step 1635.

If status reports are stored in arbitrary radio bearer group buffers, the UE regards the priority to be applied to the status reports recognized in step 1605 as the priority of the status reports in step 1630, and configures buffer status elements in step 1635. In other words, the UE generates buffer status elements corresponding to the priority to be applied to the status reports, and includes a sum of status report sizes in the buffer size information of the buffer status elements. If there already exist the buffer status elements corresponding to the priority to be applied to the status reports, the UE adds the sum of the status report sizes to the existing buffer size information.

If the sizes of the status reports have already been included in the buffer status elements of the radio bearer group to which the status reports belong, the UE subtracts the sizes of the status reports from the corresponding buffer status elements, thereby preventing the sizes of the status reports from being repeatedly included in the buffer status reports.

In step 1640, the UE determines whether there is any retransmission-scheduled RLC PDU. If there is any retransmission-scheduled RLC PDU, the UE proceeds to step 1645. However, if there is no retransmission-scheduled RLC PDU, the UE proceeds to step 1650.

If the retransmission-scheduled RLC PDUs are stored in arbitrary radio bearer group buffers, the UE regards the priority to be applied to the retransmission-scheduled RLC PDUs recognized in step 1605 as the priority of the retransmission-scheduled RLC PDUs in step 1645, and configures buffer status elements in step 1650. In other words, the UE generates buffer status elements corresponding to the priority to be applied to the retransmission-scheduled RLC PDUs, and includes the sum of sizes of the retransmission-scheduled RLC PDUs in the buffer size information of the buffer status elements. If buffer status elements corresponding to the priority to be applied to the retransmission-scheduled RLC PDUs already exist, the UE adds the sum of sizes of the retransmission-scheduled RLC PDUs to the existing buffer size information. If the sizes of the retransmission-scheduled RLC PDUs have already been included in the corresponding buffer status elements, the UE subtracts the sizes of the retransmission-scheduled RLC PDUs from other buffer status elements, thereby preventing the sizes of the retransmission-scheduled RLC PDUs from being repeatedly included in the buffer status reports.

In step 1655, the UE sends the configured buffer status reports.

Figure 17:
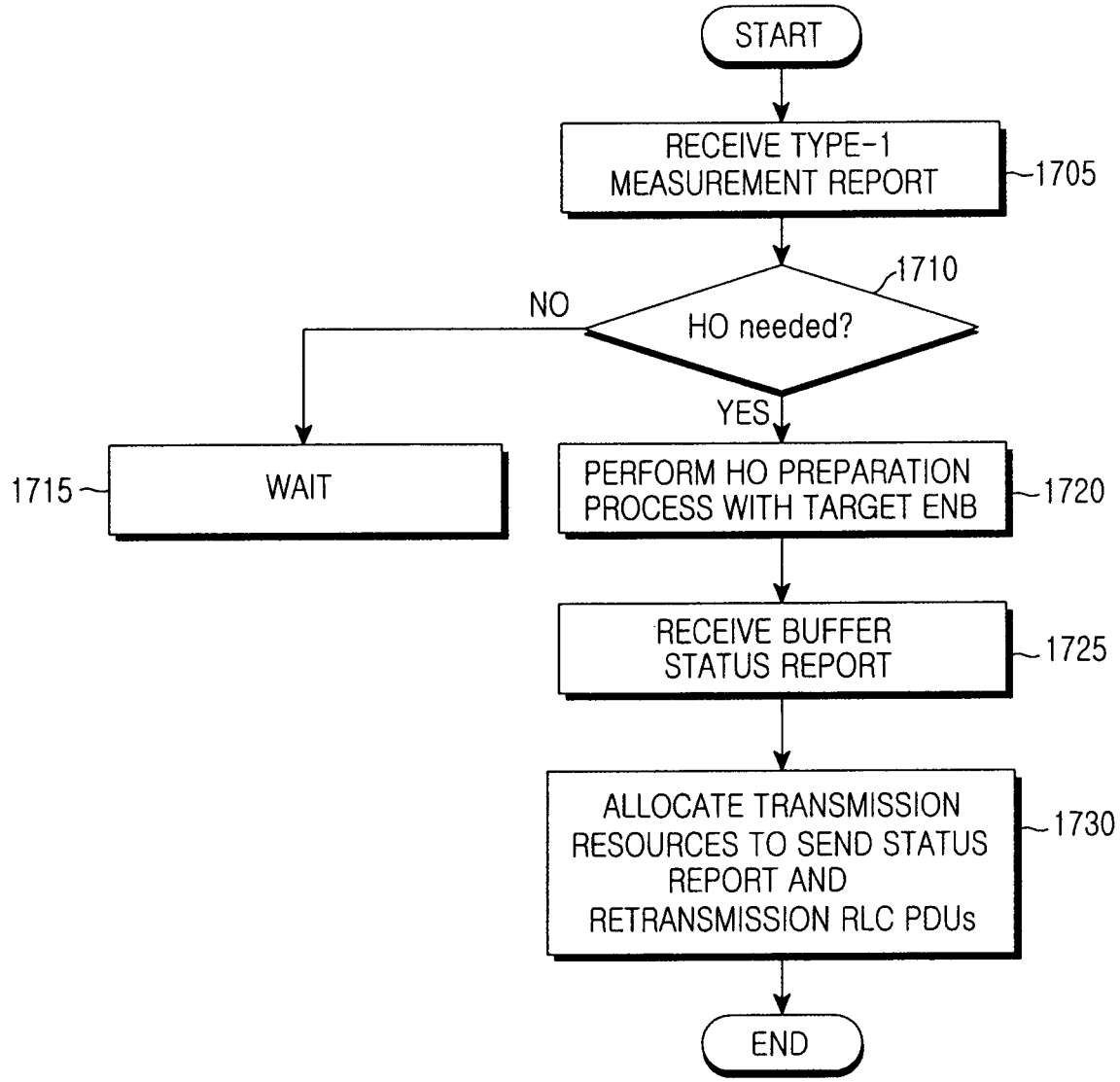
FIG. 17 illustrates an ENB's operation according to the third embodiment of the present invention.

FIG. 17 illustrates an ENB's operation according to the third embodiment of the present invention.

Referring to FIG. 17, upon receiving a type-1 measurement report in step 1705, an ENB determines whether to perform a handover in step 1710. If the ENB determines not to perform a handover, the ENB proceeds to step 1715 where the ENB operates according to the prior art. However, if the ENB determines to perform a handover, the ENB proceeds to step 1720.

In step 1720, the ENB performs a handover preparation process with a target ENB.

Upon receiving a buffer status report in step 1725, the ENB allocates transmission resources to a UE based on the buffer status report in step 1730. In this case, the ENB allocates sufficient transmission resources so that the UE can transmit both of status reports and retransmission-scheduled RLC PDUs.

Figure 18:
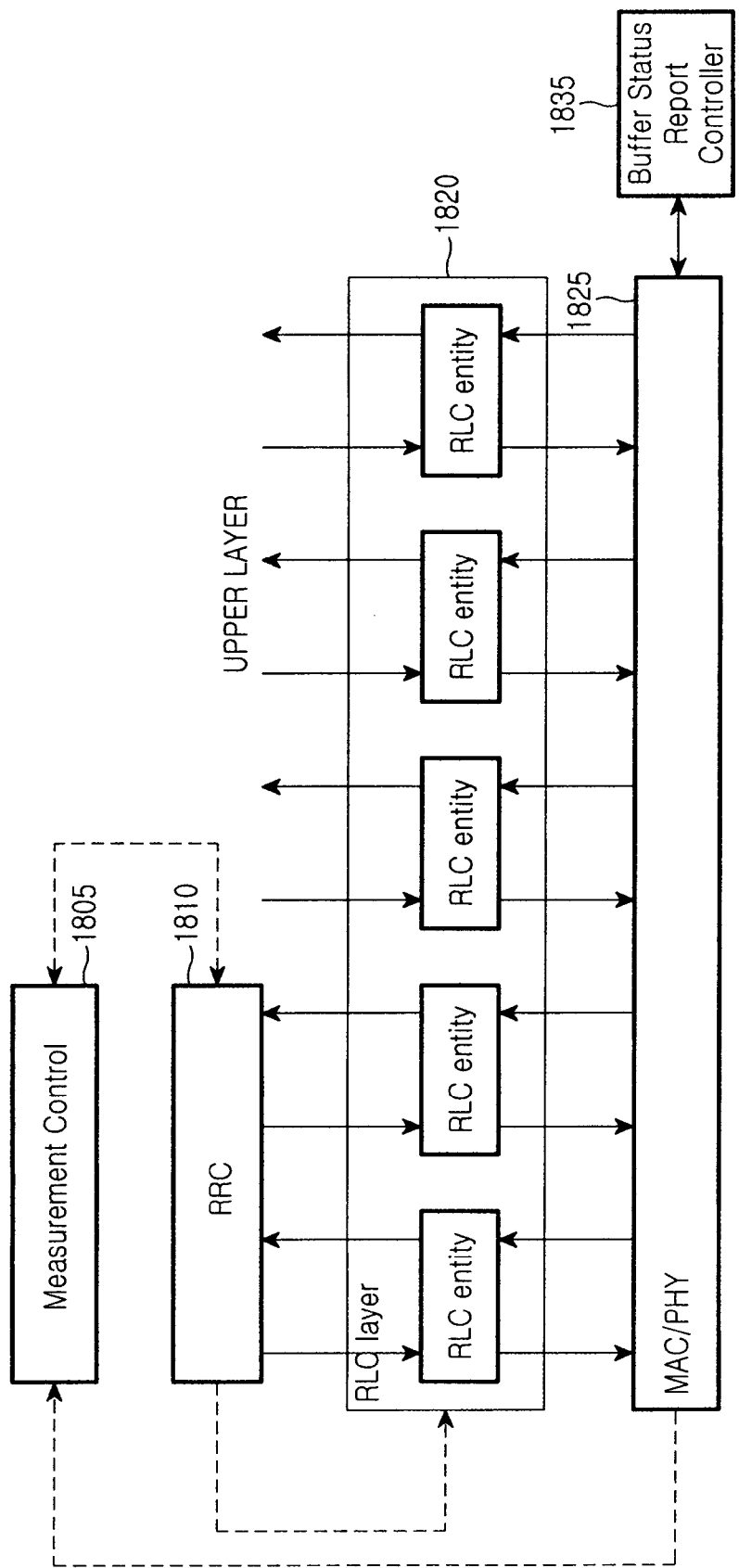
FIG. 18 illustrates a structure of a UE apparatus according to the third embodiment of the present invention.

FIG. 18 illustrates a structure of a UE apparatus according to the third embodiment of the present invention.

Referring to FIG. 18, a UE according to the third embodiment of the present invention includes a measurement controller 1805, an RRC 1810, an RLC layer 1820, a MAC/PHY 1825, and a buffer status report controller 1835.

The measurement controller 1805 controls a received signal strength measurement process of the UE, and forwards a measurement result to be contained in a measurement report to the RRC 1810 if a measurement report condition is satisfied. Particularly, in the third embodiment of the present invention, the measurement controller 1805 recognizes a type of the 'measurement report having a high handover-causing possibility', and if the 'measurement report having a high handover-causing possibility' occurs, the measurement controller 1805 reports it to the RRC 1810.

Upon receiving the measurement result reported from the measurement controller 1805, the RRC 1810 generates an RRC message, called a measurement report, using the received measurement result, and sends it to an ENB. In addition, if the measurement controller 1805 sends a report indicating occurrence of the 'measurement report having a high handover-causing possibility', the RRC 1810 commands RLC entities of the RLC layer 1820, configured at a corresponding time, to generate and send status reports. Further, the RRC 1810 sends the buffer status report controller 1835 a notification indicating the imminence of the handover.

The RLC layer 1820 is a set of RLC entities in charge of reliable transmission/reception of upper layer data or RRC messages, and the MAC/PHY 1825 is a device in charge of transmission/reception of RLC PDUs.

The buffer status report controller 1835 monitors the status of transmission buffers of the radio bearers, and also monitors whether a buffer status report triggering condition is satisfied. If the buffer status report triggering condition is satisfied, the buffer status report controller 1835 starts the buffer status report procedure.

Upon receiving a notification indicating the imminence of the handover from the RRC layer 1810, the buffer status report controller 1835 immediately starts the buffer status report procedure, considering that the buffer status report triggering condition is satisfied.

The buffer status report controller 1835 checks sizes of the status reports and retransmission-scheduled RLC PDUs stored in transmission buffers of the radio bearers, and configures buffer status elements for the status reports and the retransmission-scheduled RLC PDUs. In addition, the buffer status report controller 1835 forwards buffer status reports containing the configured buffer status elements to the MAC/PHY 1825.

The MAC/PHY 1825 sends the buffer status reports to the ENB.

As can be appreciated from the foregoing description, the present invention allows the UE to send a status report to the source ENB immediately before occurrence of the handover, thereby preventing the RLC PDUs, which were successfully transmitted to the source cell but have not been ACKed yet by the UE, from being forwarded to the target cell. As a result, the amount of data being forwarded from the source ENB to the target ENB can be minimized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a handover from a source cell to a target cell in a mobile communication system, the method comprising:
    sending, by a User Equipment (UE), a measurement report on received signal strengths of adjacent cells, to a Node B of the source cell;
    determining, by the Node B of the source cell, a handover of the UE based on the measurement report;
    sending, by the Node B of the source cell, a handover preparation message to the UE;
    performing, by the Node B of the source cell, a handover preparation process with a Node B of the target cell;
    after receiving the handover preparation message, sending, by the UE, to the Node B of the source cell, a status report including a sequence number of successfully received packet data and a sequence number of missing packet data;
    discarding, by the Node B of the source cell, the successfully received packet data, retransmitting the missing packet data to the UE, and forwarding an un-acknowledged packet data to the Node B of the target cell, based on the sequence numbers included in the received status report; and
    upon a receipt of a handover command from the Node B of the source cell, performing a handover by the UE.

2. A method for sending a buffer status report by a User Equipment (UE) for performing a handover from a source cell to a target cell in a mobile communication system, the method comprising:
    if a measurement report triggering a buffer status report procedure occurs, sending a request for a resource allocation for a buffer status report to a Node B;
    configuring a buffer status report, when a handover is imminent;
    sending the buffer status report including information on retransmission-required packet data over resources allocated by the request; and
    sending the measurement report and a downlink status report, and retransmitting the retransmission-required packet data over resources allocated, according to the buffer status report,
    wherein the measurement report triggering the buffer status report procedure is defined according to a policy of an operator or a network operation method, and
    wherein the buffer status report includes a size of the measurement report, a sum of sizes of downlink status reports including sequence numbers of packet data successfully received and sequence numbers of missing packet data, and a sum of the retransmission-required packet data.

3. The method of claim 2, wherein the buffer status report further comprises a size of a downlink status report configured at a transmission time of the buffer status report, and a size of data stored in a buffer of a radio bearer group to which the measurement report belongs.

4. The method of claim 3, further comprising:
    if the measurement report triggering the buffer status report procedure occurs, setting a priority of the downlink status report and the retransmission-required packet data to a predetermined priority;
    wherein the buffer status report further includes an identifier of a radio bearer group corresponding to the predetermined priority to be applied to the downlink status report and the retransmission-required packet data.

5. A User Equipment (UE) apparatus for sending a buffer status report to a Node B of a source cell for performing a handover from a source cell to a target cell in a mobile communication system, the apparatus comprising:
    a measurement controller for measuring received signal strengths of adjacent cells;
    a radio resource controller for generating a message using a measurement result received from the measurement controller, and sending the generated message to the Node B of the source cell;
    a radio link controller for generating a status report message upon receipt of a status report command from the radio resource controller before performing a handover to a target cell, and sending the generated status report message to the Node B of the source cell;
    a buffer status report controller for starting a buffer status report procedure under a control of the radio resource controller if a measurement report triggering the buffer status report procedure occurs, and configuring a buffer status report including information on retransmission-required packet data; and
    a physical layer for sending the configured buffer status report to the Node B and retransmitting the retransmission-required packet data,
    wherein the measurement report triggering the buffer status report procedure is defined according to a policy of an operator or a network operation method.

6. The UE apparatus of claim 5, wherein the physical layer sends a measurement report, a downlink status report, and the retransmission-required packet data over resources allocated according to the buffer status report.

7. The UE apparatus of claim 6, wherein the buffer status report further includes a size of a downlink status report configured at a transmission time of the buffer status report, and a size of data stored in a buffer of a radio bearer group to which the measurement report belongs.

8. The UE apparatus of claim 7, wherein if the measurement report triggering the buffer status report procedure occurs, the radio link controller sets a priority of the downlink status report and the retransmission-required packet data to a predetermined priority; and
    wherein the buffer status report further includes an identifier of a radio bearer group corresponding to the predetermined priority to be applied to the downlink status report and the retransmission-scheduled data.

9. A method for performing a handover from a source cell to a target cell in a mobile communication system, the method comprising:
    sending, by a User Equipment (UE), a measurement report on received signal strengths of adjacent cells, to a Node B of the source cell, and determining whether the measurement report satisfies a handover condition predefined between the UE and the Node B of the source cell;
    determining, by the Node B of the source cell, a handover of the UE based on the measurement report, and performing a handover preparation process with a Node B of the target cell;

when the measurement report satisfies the handover condition, sending, by the UE, to the Node B of the source cell, a status report including a sequence number of successfully received packet data and a sequence number of missing packet data;

discarding, by the Node B of the source cell, the successfully received packet data, retransmitting the missing packet data to the UE, and forwarding an un-acknowledged packet data to the Node B of the target cell, based on the sequence numbers included in the received status report; and upon a receipt of a handover command from the Node B of the source cell, performing a handover by the UE.

10. A system for performing a handover from a source cell to a target cell in a mobile communication system, the system comprising:

a User Equipment (UE), including:
        a measurement controller for measuring received signal strengths of adjacent cells;
        a radio resource controller for generating a message using a measurement result received from the measurement controller, sending the generated message to a Node B of the source cell, and sending a status report command, upon a receipt of a handover preparation message from the Node B of the source cell; and
        a radio link controller for, upon receipt of the status report command from the radio resource controller, generating a status report message before performing a handover to the target cell, and sending to the Node B of the source cell the generated status report message including a sequence number of successfully received packet data and a sequence number of missing packet data, the Node B of the source cell, including a Radio Resource Control (RRC) entity for determining a handover of the UE based on the measurement report message, sending the handover preparation message to the UE, performing a handover preparation process with a Node B of the target cell, and sending a handover command to the UE; and a Radio Link Control (RLC) entity for, upon a receipt of the status report message from the UE, discarding successfully received packet data, retransmitting missing packet data to the UE, and forwarding an un-acknowledged packet data to the Node B of the target cell, based on the sequence numbers included in the received status report.

11. A system for performing a handover from a source cell to a target cell in a mobile communication system, the system comprising:

a User Equipment (UE), including:
        a measurement controller for measuring received signal strengths of adjacent cells, determining whether the measurement result satisfies a handover condition predefined between the UE and a Node B of the source cell, sending a determination result to a radio resource controller;
        the radio resource controller for generating a message using the measurement result received from the measurement controller, sending the generated message to the Node B of the source cell, and sending a status report command according to a determination result of the measurement controller; and
        a radio link controller for, upon receipt of the status report command from the radio resource controller, generating the status report message before performing a handover to the target cell, and sending the generated status report message to the Node B of the source cell;

the Node B of the source cell, including a Radio Resource Control (RRC) entity for determining a handover of the UE based on the measurement report message, performing a handover preparation process with the Node B of the target cell, and sending a handover command to the UE; and a Radio Link Control (RLC) entity for, upon receipt of the status report message from the UE, discarding successfully received packet data, retransmitting missing packet data to the UE, and forwarding an un-acknowledged packet data to the Node B of the target cell, based on the received status report.

\* \* \* \* \*